(12) United States Patent
Mitani et al.

(10) Patent No.: US 11,399,144 B2
(45) Date of Patent: Jul. 26, 2022

(54) IMAGING APPARATUS, IMAGE FORMING METHOD, AND IMAGING SYSTEM

(71) Applicant: Sony Group Corporation, Tokyo (JP)

(72) Inventors: Hitoshi Mitani, Kanagawa (JP); Masafumi Wakazono, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 273 days.

(21) Appl. No.: 16/628,590

(22) PCT Filed: Jun. 4, 2018

(86) PCT No.: PCT/JP2018/021422
§ 371 (c)(1),
(2) Date: Jan. 3, 2020

(87) PCT Pub. No.: WO2019/012858
PCT Pub. Date: Jan. 17, 2019

(65) Prior Publication Data
US 2020/0162680 A1 May 21, 2020

(30) Foreign Application Priority Data
Jul. 12, 2017 (JP) .............................. JP2017-136396

(51) Int. Cl.
*H04N 5/265* (2006.01)
*G02B 5/30* (2006.01)
*G02B 27/28* (2006.01)

(52) U.S. Cl.
CPC ........... *H04N 5/265* (2013.01); *G02B 5/3025* (2013.01); *G02B 27/283* (2013.01)

(58) Field of Classification Search
None
See application file for complete search history.

(56) References Cited

U.S. PATENT DOCUMENTS

2010/0039707 A1* 2/2010 Akahane .............. H04N 9/3129
359/321
2013/0335533 A1* 12/2013 Yamazaki ......... H01L 27/14627
348/49

(Continued)

FOREIGN PATENT DOCUMENTS

CN 1655025 A 8/2005
CN 101000300 A 7/2007

(Continued)

OTHER PUBLICATIONS

English translation of WO-2014119257-A1, Imamura N, Aug. 2014 (Year: 2014).*

(Continued)

*Primary Examiner* — James M Hannett
(74) *Attorney, Agent, or Firm* — Michael Best & Friedrich LLP

(57) ABSTRACT

Easy acquisition of an image expressing a transparent part and an opaque part, for example, is achievable by one-time imaging.
An imaging apparatus includes an imaging unit and an image forming unit. The imaging unit has a pixel group that includes a first pixel group including a pixel capable of receiving light having a first polarization direction, and a second pixel group. The image forming unit forms a first image corresponding to a second polarization direction that is a predetermined polarization direction on the basis of signals of a pixel group including at least the first pixel group, and forms a second image different from the first image on the basis of signals of a pixel group including at least the second pixel group.

18 Claims, 21 Drawing Sheets

(56) References Cited

U.S. PATENT DOCUMENTS

2014/0055661 A1 2/2014 Imamura et al.
2017/0295297 A1* 10/2017 Ishimatsu ............ G02B 27/286

FOREIGN PATENT DOCUMENTS

| | | | | |
|---|---|---|---|---|
| CN | 102356628 | A | | 2/2012 |
| CN | 103460024 | A | | 12/2013 |
| CN | 104414646 | A | | 3/2015 |
| CN | 105049690 | A | | 11/2015 |
| CN | 105676475 | A | | 6/2016 |
| CN | 105959514 | A | | 9/2016 |
| CN | 105973164 | A | | 9/2016 |
| JP | 2003-098072 | A1 | | 4/2003 |
| JP | 2015180864 | A | | 10/2015 |
| JP | 2015180864 | A | * | 10/2015 ............ G01N 21/21 |
| JP | 2017009580 | A | * | 1/2017 |
| JP | 2017009580 | A | | 1/2017 |
| JP | 2017228910 | A | | 12/2017 |
| WO | WO-2013114891 | A1 | * | 8/2013 ......... A61B 1/00096 |
| WO | 2014/119257 | A1 | | 8/2014 |
| WO | WO-2014119257 | A1 | * | 8/2014 ........... A61B 5/0077 |
| WO | 2013/114891 | A1 | | 5/2015 |

OTHER PUBLICATIONS

English translation of WO-2013114891-A1, Imamura N, Aug. 2013 (Year: 2013).*
English translation of JP-2017009580-A, Nakamura H, Jan. 2017 (Year: 2017).*
English translation of JP-2015180864-A, Kanamori K, Oct. 2015 (Year: 2015).*
Chinese Office Action dated Jul. 6, 2021 for corresponding Chinese Application No. 201880044796.7.
Chinese Office Action dated Jan. 27, 2021 for corresponding Chinese Application No. 201880044796.7.
International Search Report and Written Opinion dated Jul. 10, 2018 for corresponding International Application No. PCT/JP2018/021422.

* cited by examiner

FIG.3
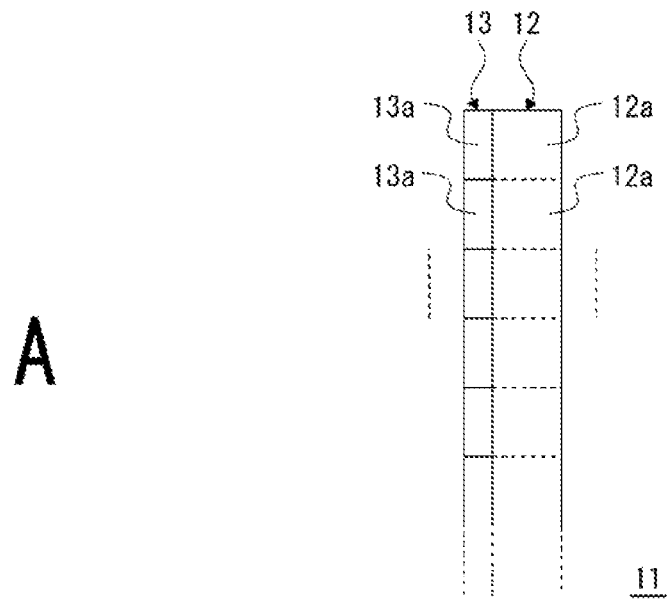
A
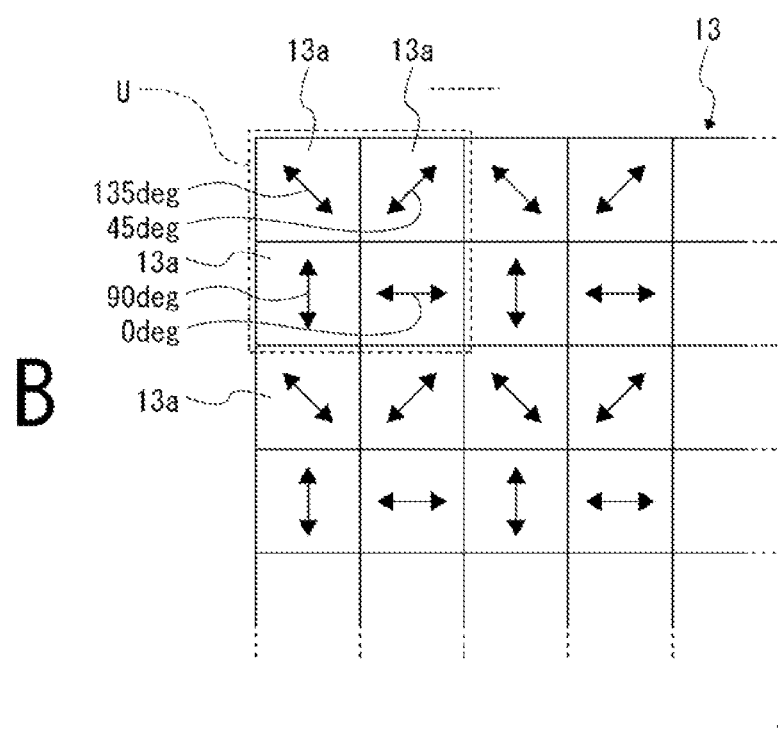
B

FIG.5
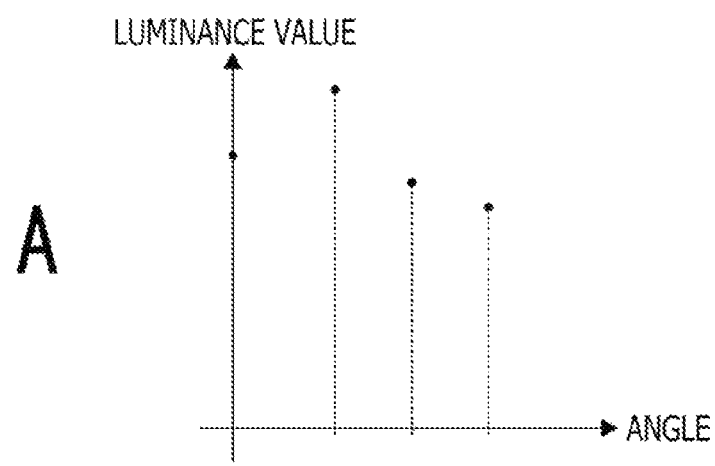
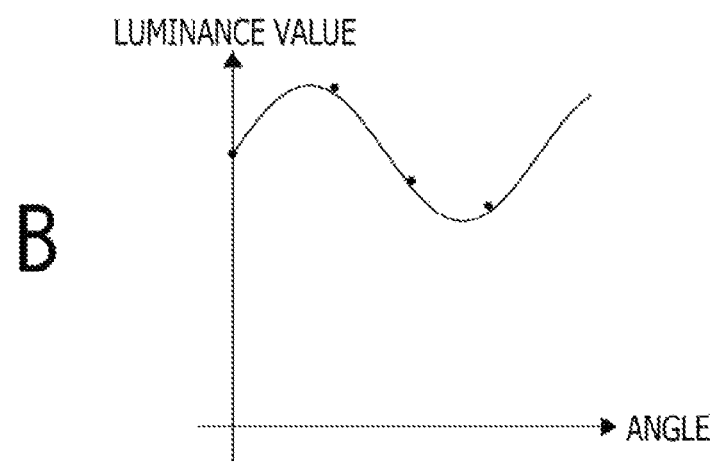

FIG.16
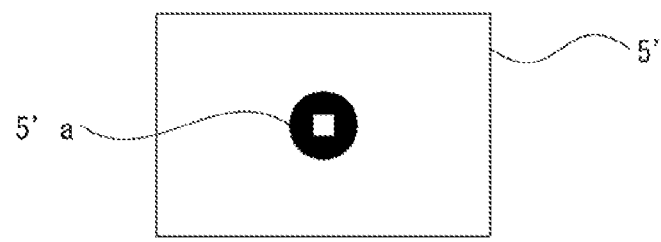
FIG.17
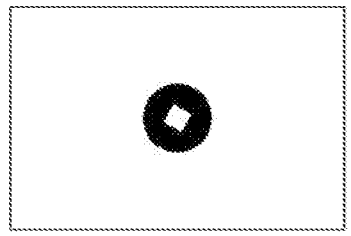
A     POLARIZED BACKLIGHT + CANCEL IMAGE
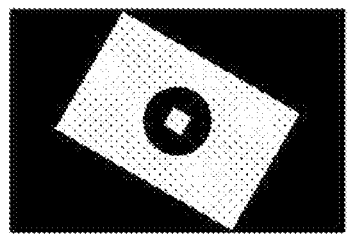
B     POLARIZED BACKLIGHT + ORTHOGONAL IMAGE
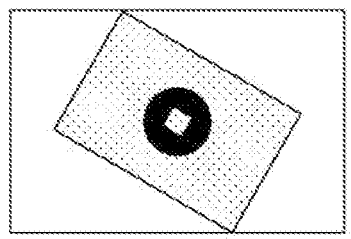
C     POLARIZED BACKLIGHT + PARALLEL IMAGE FIG.18
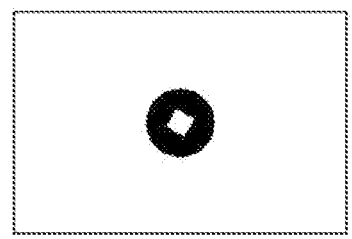
A  NORMAL LIGHTING + CANCEL IMAGE
B  POLARIZED BACKLIGHT + ORTHOGONAL IMAGE
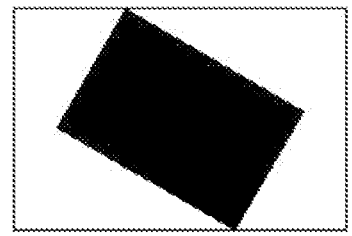
C  POLARIZED BACKLIGHT + PARALLEL IMAGE FIG.23
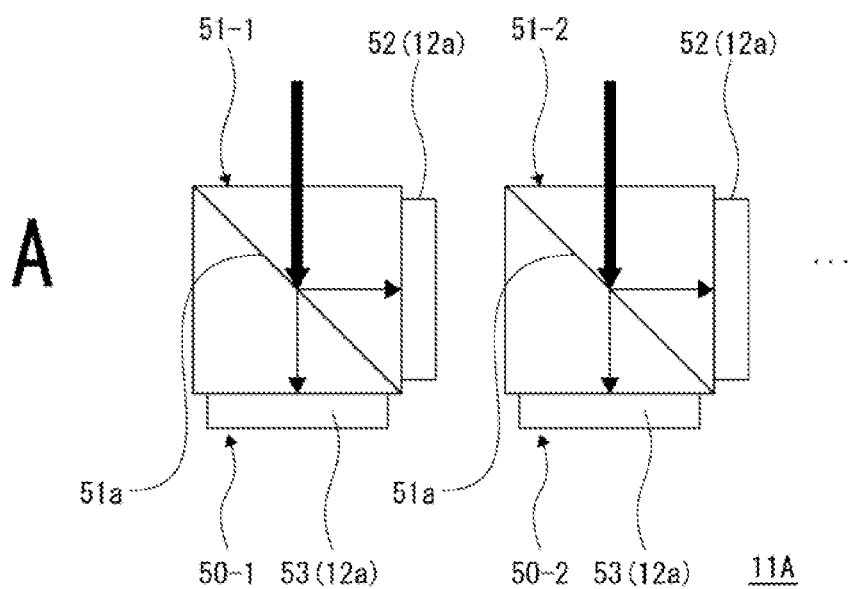
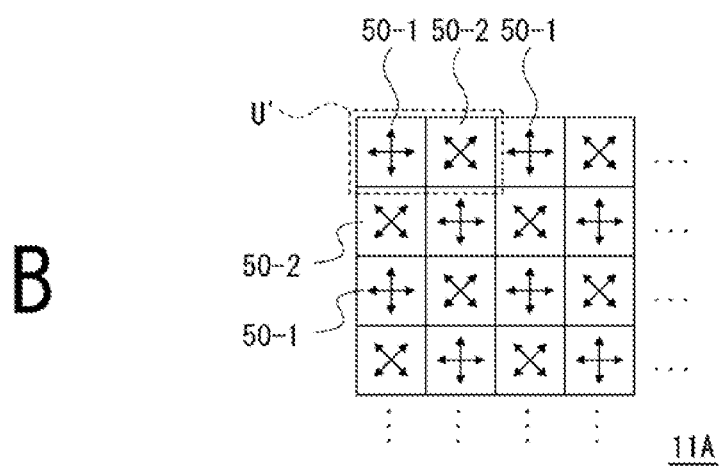

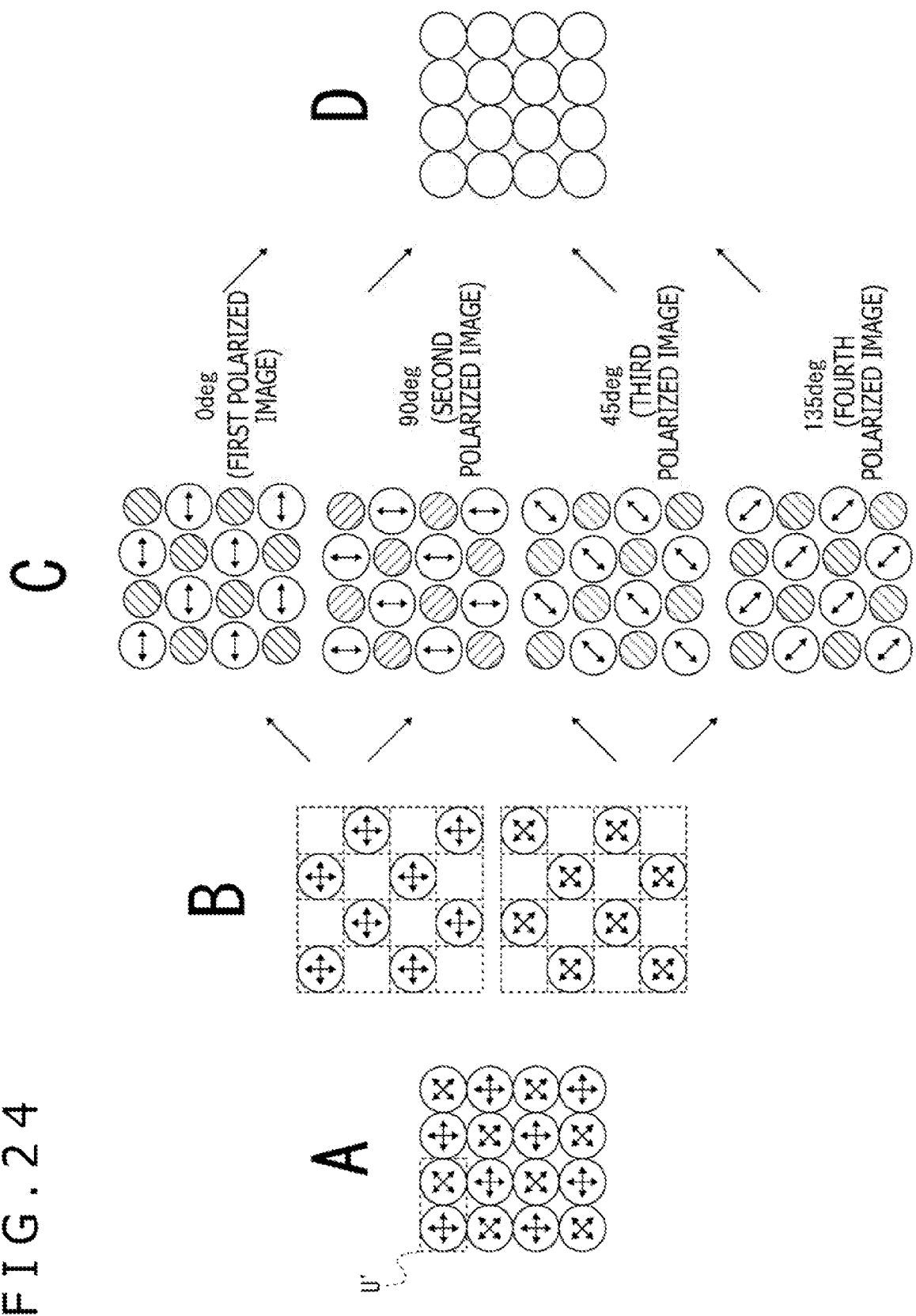

IMAGING APPARATUS, IMAGE FORMING METHOD, AND IMAGING SYSTEM

TECHNICAL FIELD

The present technology relates to an imaging apparatus, an image forming method, and an imaging system, and more particularly to a technology applicable to and suited for a case where a polarized image obtained using selectively received linear polarized light in any polarization direction is formed by signal processing.

BACKGROUND ART

For example, reduction of surface reflection on a water surface or a glass surface, and control of blueness of the sky are achievable by using a polarizing filter which is rotatable and attached to a lens of an imaging apparatus. A user can control effectiveness of filter effects by controlling a rotation angle of the polarizing filter.

Note that PTL 1 below is an example of associated conventional technologies.

CITATION LIST

Patent Literature

[PTL 1]
Japanese Patent Laid-open No. 2003-98072

SUMMARY

Technical Problems

As presented in PTL 1, a transparent plastic molded product or the like is imaged by using polarized lighting with a camera to which a polarizing filter in a direction orthogonal to the polarized lighting is attached, while utilizing a characteristic of birefringence of the molded product to capture the image of the molded product or the like.

In this case, for imaging a work (inspection target product) which includes both a transparent part and an opaque part, individual stages are provided, and images of the transparent part and the opaque part are separately captured using different cameras.

Accordingly, an imaging system configuration for inspection becomes complicated.

In addition, while an image of the inspection target product including both the transparent part and the opaque part is obtained by synthesizing the captured images of the transparent part and the opaque part, a process of alignment is obviously required during synthesis of a plurality of images captured by the different cameras. Accordingly, heavy loads are imposed by an image synthesizing process.

The present technology has been made in view of the aforementioned circumstances. An object of the present technology is to obtain an image where an object including a mixture of a transparent part and an opaque part is appropriately observable, for example, by one-time imaging using one imaging apparatus.

Solution to Problems

An imaging apparatus according to the present technology includes: an imaging unit which has a pixel group that includes a first pixel group including a pixel capable of receiving light having a first polarization direction, and a second pixel group; and an image forming unit which forms a first image corresponding to a second polarization direction that is a predetermined polarization direction on the basis of signals of a pixel group including at least the first pixel group, and forms a second image different from the first image on the basis of signals of a pixel group including at least the second pixel group.

The image corresponding to the polarization direction refers to a polarized image including a component in a single polarization direction. According to the above configuration, the first image corresponding to the predetermined polarization direction as the second polarization direction, and also the second image different from the first image are obtained on the basis of signals of the common imaging unit.

According to the imaging apparatus of the present technology described above, it is considered that the imaging unit images an object that has optical transparency. In this case, light having passed through the object includes light having the second polarization direction.

In this manner, an image presenting the transparent part of the object can be obtained as the first image.

According to the imaging apparatus of the present technology described above, it is considered that the first polarization direction and the second polarization direction are identical to each other.

In this manner, the first image can be formed using signals of the first pixel group without change, and without using a function described below.

According to the imaging apparatus of the present technology described above, it is considered that the first polarization direction and the second polarization direction are different from each other.

In this manner, an image corresponding to a polarization direction different from the first polarization direction (i.e., polarization direction of linear polarized light receivable by the first pixel group) can be obtained as the first image such as the orthogonal image. In other words, for obtaining the first image, the necessity of equalizing the polarization direction corresponding to the first image and the polarization direction of linear polarized light receivable by the first pixel group is eliminated.

According to the imaging apparatus of the present technology described above, it is considered that the image forming unit simultaneously forms the first image and the second image.

In this manner, the first image and the second image are simultaneously formed on the basis of signals of the common imaging unit.

According to the imaging apparatus of the present technology described above, it is considered that the imaging unit includes a plurality of pixel units each of which includes a plurality of pixels each having a predetermined number of light receiving elements, and a polarization unit that causes the pixels to receive linear polarized lights having polarization directions different for each of the pixels.

In this manner, each of the pixel units receives linear polarized light having a different polarization direction for each pixel.

According to the imaging apparatus of the present technology described above, when a rotation angle of a polarizing filter that is rotatable is a virtual filter angle on an assumption that a captured image is obtained by receiving light via the polarizing filter, the image forming unit forms, as one of image data to be formed, image data that becomes an orthogonal image corresponding to an image obtained in a case where the virtual filter angle is an angle substantially orthogonal to a polarization direction of linear polarized light having entered the polarization unit.

In other words, an orthogonal image presenting a transparent part is obtained.

According to the imaging apparatus of the present technology described above, it is considered that the image forming unit acquires a function that indicates a relation between the virtual filter angle and light reception signal values of the light receiving elements included in the pixel unit and receiving linear polarized lights different from each other, and forms image data that becomes the orthogonal image using the function.

In other words, an orthogonal image presenting a transparent part is obtained by using the function indicating the relation between the virtual filter angle and the light reception signal value.

According to the imaging apparatus of the present technology described above, it is considered that the image forming unit forms, as one of image data to be formed, image data that becomes a cancel image that cancels a function of the polarizing filter.

In other words, a cancel image presenting an opaque part is obtained as well as the orthogonal image presenting the transparent part.

According to the imaging apparatus of the present technology described above, it is considered that the image forming unit performs a process of forming a synthesis image of the orthogonal image and the cancel image.

In other words, a synthesis image which synthesizes the orthogonal image presenting the transparent part, and the cancel image presenting an opaque part is formed.

According to the imaging apparatus of the present technology described above, it is considered that the image forming unit performs a process of forming a synthesis image of an image of a transparent part extracted on the basis of a difference between the orthogonal image and the cancel image, and an image of an opaque part extracted from the cancel image.

The transparent part of the object can be extracted on the basis of the difference between the orthogonal image and the opaque part. The cancel image is a normal image, wherefore extraction of the opaque part from the cancel image is achievable.

According to the imaging apparatus of the present technology described above, it is considered that the image forming unit forms an image where a contour of a transparent object is observable.

More specifically, an image where the contour of the transparent object is observable is formed by calculation of an image corresponding to a predetermined polarization condition, synthesis of a plurality of images corresponding to a predetermined polarization condition, or others.

According to the imaging apparatus of the present technology described above, it is considered that the image forming unit forms an image where a contour of an opaque object is observable.

More specifically, an image where the contour of the opaque object is observable is formed by calculation of an image corresponding to a predetermined polarization condition, synthesis of a plurality of images corresponding to a predetermined polarization condition, or others.

According to the imaging apparatus of the present technology described above, it is considered that the image forming unit forms an image where a contour of an object is observable, and forms an image subjected to rotation correction using information indicating the contour determined from the image.

An inclination is detectable from a contour line of a transparent object or an opaque object. Rotation compensation of an image presenting an object is performed on the basis of an inclination detected in this manner.

According to the imaging apparatus of the present technology described above, it is considered that the imaging unit includes a plurality of pixel pairs each of which includes a polarization splitter, a first type of pixel which includes a predetermined number of light receiving elements each of which has a light receiving surface substantially orthogonal to an optical axis of reflection light reflected on a separation surface of the polarization splitter to receive the reflection light, and a second type of pixel which includes a predetermined number of light receiving elements each of which has a light receiving surface substantially orthogonal to an optical axis of transmission light transmitted through a separation surface of the polarization splitter to receive the transmission light, and in-plane angles of polarization axes of the separation surfaces of the polarization splitters included in the pixel pair disposed adjacent to each other are different from each other.

The imaging unit described above is capable of selectively receiving two types of linear polarized lights having polarization directions orthogonal to each other for the one pixel pair (one pixel position), and is capable of selectively receiving four types of linear polarized lights having different polarization directions for the two pixel pairs disposed adjacent to each other.

An image forming method according to the present technology includes: imaging an object using an imaging unit which has a pixel group that includes a first pixel group including a pixel capable of receiving light having a first polarization direction, and a second pixel group; and forming a first image corresponding to a second polarization direction that is a predetermined polarization direction on the basis of signals of a pixel group including at least the first pixel group, and forming a second image different from the first image on the basis of signals of a pixel group including at least the second pixel group.

Actions similar to the actions performed by the imaging apparatus according to the present technology are also performed by this image forming method.

An imaging system according to the present technology includes: polarized lighting which applies light that is linear polarized light; an imaging unit which has a pixel group that includes a first pixel group including a pixel capable of receiving light having a first polarization direction, and a second pixel group; and an image forming unit which forms a first image corresponding to a second polarization direction that is a predetermined polarization direction on the basis of signals of a pixel group including at least the first pixel group, and forms a second image different from the first image on the basis of signals of a pixel group including at least the second pixel group.

For example, the polarized lighting refers to lighting which applies polarized light at a predetermined angle to an object using a configuration which includes a lighting device and a polarizing filter or the like.

According to the imaging system of the present technology described above, it is considered that the imaging system further includes lighting that applies non-polarized light to an object in a direction different from a direction of the polarized lighting.

For example, lighting which guides image light on the surface of the object toward the imaging unit is added.

According to the imaging system of the present technology described above, it is considered that the imaging unit is disposed in such a position as to image a front surface side of an object in a state where the polarized lighting applies light to the object from a rear surface side of the object.

In this case, an image which separates a portion producing birefringence of the polarized lighting in the object can be formed.

According to the imaging system of the present technology described above, it is considered that the imaging unit is disposed in such a position as to image a front surface side of an object in a state where the polarized lighting applies light to the object from a rear surface side of the object, and lighting that applies non-polarized light from a front side of the object is provided.

In this case, performed is such imaging which forms an image separating a portion producing birefringence of polarized lighting in the object, and an image capable of expressing a surface of the object.

Advantageous Effects of Invention

According to the present technology, a first image corresponding to a predetermined polarization direction, and a second image different from the first image can be obtained by one-time imaging using an imaging apparatus. Accordingly, captured images of a transparent part and an opaque part of an object can be obtained by one-time imaging, for example.

Note that advantageous effects to be produced are not necessarily limited to the advantageous effects described herein, but may be any of the advantageous effects described in the present disclosure.

BRIEF DESCRIPTION OF DRAWINGS

FIG. 3 is an explanatory diagram depicting a structure of an imaging unit included in the imaging apparatus according to the first embodiment.

FIG. 5 is an explanatory diagram depicting fitting of a function according to embodiments.

FIG. 16 is an explanatory diagram depicting an example of an assumed object according to the third embodiment.

FIG. 17 is a diagram depicting an example of a cancel image, an orthogonal image, and a parallel image obtained in a case where a transparent sheet is imaged according to the third embodiment.

FIG. 18 is a diagram depicting an example of a cancel image, an orthogonal image, and a parallel image obtained in a case where an opaque sheet is imaged according to the third embodiment.

FIG. 23 is an explanatory view depicting a structure of an imaging unit according to a modified example.

FIG. 24 is a diagram explaining an example of a forming method of a first polarized image to a fourth polarized image and a cancel image formed in a case where the imaging unit of the modified example is used.

DESCRIPTION OF EMBODIMENTS

Embodiments according to the present technology will be hereinafter described with reference to the accompanying drawings in a following order.

<1. First Embodiment>
1-1. Configuration Outline of Imaging System
1-2. Formation of Virtual Polarized Image by Signal Processing
1-3. Image Acquisition Method in First Embodiment]
1-4. Processing Procedures
<2. Second Embodiment>
2-1. Configuration Outline of Imaging System
2-2. Image Acquisition Method in Second Embodiment
2-3. Processing Procedures
<3. Third Embodiment>
3-1. System Configuration Outline
3-2. Corresponding Method for Transparent Sheet and Opaque Sheet
3-3. Processing Example
<4. Modified Example of Imaging Unit>
<5. Summary of Embodiments>
<6. Present Technology>

1. First Embodiment 1-1. Configuration Outline of Imaging System

Figure 1:
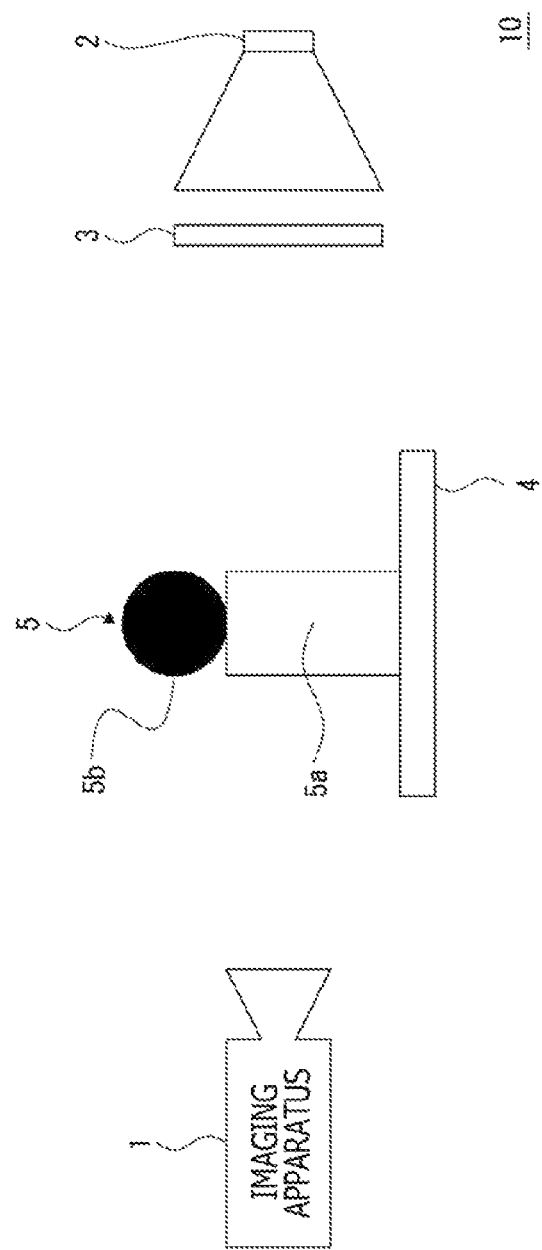
FIG. 1 is a diagram depicting a configuration example of an imaging system according to a first embodiment.

FIG. 1 depicts a configuration example of an imaging system 10 which includes an imaging apparatus 1 according to a first embodiment of the present technology.

The imaging system 10 includes the imaging apparatus 1, a light emission unit 2, a polarizing filter 3, and a stage 4.

The imaging apparatus 1 includes an imaging unit 11 described below, and is capable of obtaining a captured image of an object 5 which includes a transparent part 5*a* and an opaque part 5*b* and disposed on the stage 4.

Examples of the object 5 having the transparent part 5*a* and the opaque part 5*b* herein include a plastic bottle product and the like. For example, such a plastic bottle product which includes a transparent container corresponding to the transparent part 5*a*, and a cap portion or a stopper portion corresponding to the opaque part 5*b* is considered as an example of the object 5.

The light emission unit 2 is disposed in such a position as to face the imaging apparatus 1 via the stage 4, and emits light toward the imaging apparatus 1. The light emission unit 2 includes, for example, a necessary light emission element as a light source, such as an LED (Light Emitting Diode), a fluorescent light, and an incandescent light bulb, and emits non-polarized light (natural light).

The polarizing filter 3 is disposed on the light emission surface side of the light emission unit 2, and selectively transmits linear polarized light included in the emission light from the light emission unit 2 and corresponding to a specific polarization direction. This linear polarized light is emitted from the polarizing filter 3 toward the object 5 disposed on the stage 4. In other words, the linear polarized light is emitted toward the imaging apparatus 1 located on the inner side of the stage 4 as viewed from the polarizing filter 3.

Each of the light emission unit 2 and the polarizing filter 3 functions as polarized lighting which applies linear polarized light corresponding to the specific polarization direction to the object 5 from the rear of the object 5 disposed on the stage 4 as viewed from the imaging apparatus 1. In this sense, the polarized lighting constituted by the light emission unit 2 and the polarizing filter 3 is hereinafter referred to as "polarized backlight."

In addition, the state that the imaging apparatus 1 so located as to face the polarized backlight with the object 5 disposed on the boundary in the manner as described above can be also referred to as a state that the imaging apparatus 1 is disposed in such a position as to image the front surface side of the object 5 to which the polarized light is applied from the rear surface side of the object 5.

Figure 2:
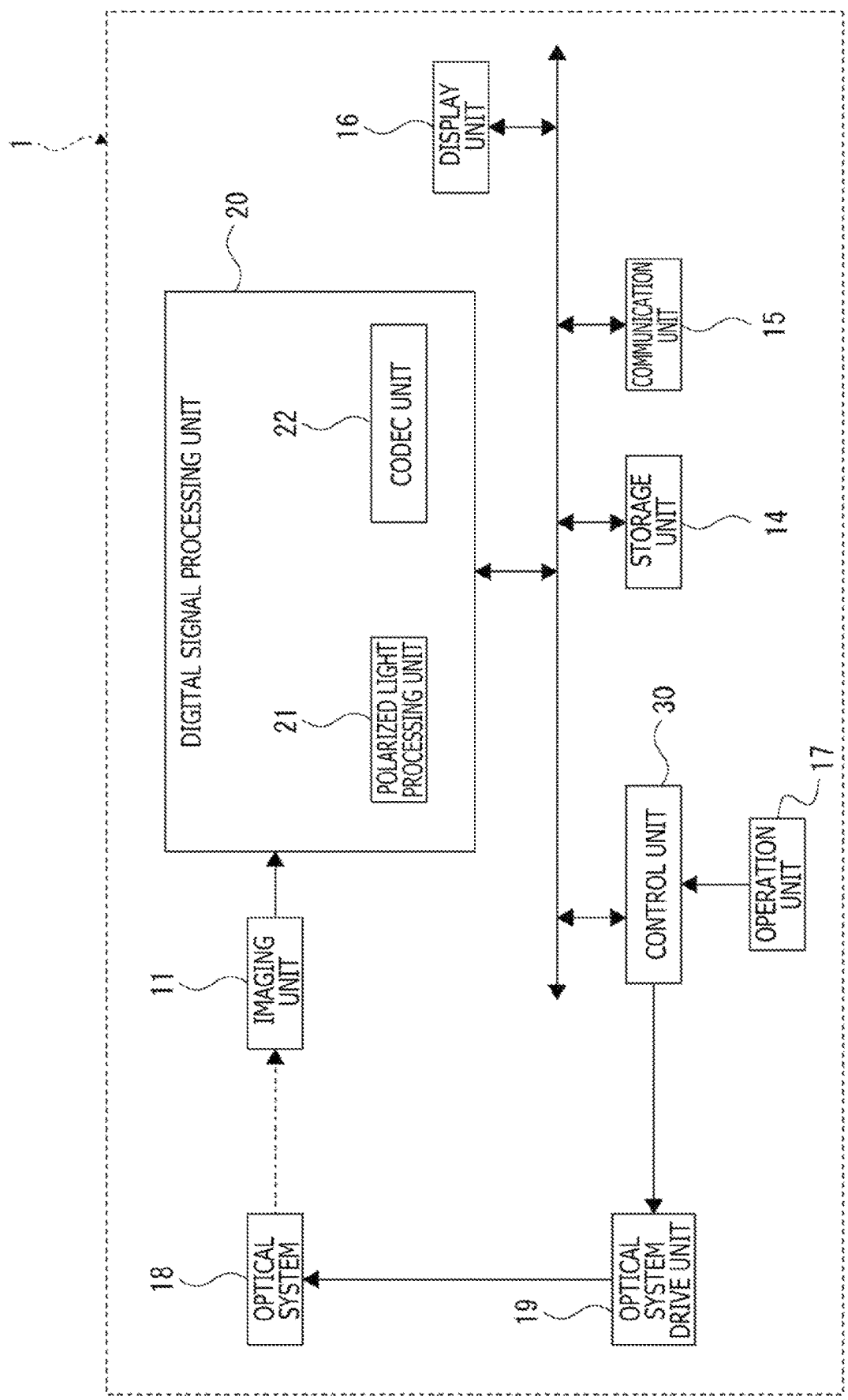
FIG. 2 is a block diagram depicting an internal configuration example of an imaging apparatus according to the first embodiment.

FIG. 2 is a block diagram depicting an internal configuration example of the imaging apparatus 1.

The imaging apparatus 1 includes an imaging unit 11, a storage unit 14, a communication unit 15, a display unit 16, an operation unit 17, an optical system 18, an optical system drive unit 19, a digital signal processing unit 20, and a control unit 30.

The optical system 18 includes lenses such as a cover lens, a zoom lens, and a focus lens, and a diaphragm mechanism. Light from the object is condensed by the optical system 18 and applied to an imaging device 12 of the imaging unit 11.

The imaging unit 11 includes, for example, the imaging device 12 (described below) such as a CCD (Charge Coupled Device) type and a CMOS (Complementary Metal-Oxide Semiconductor) type, executes, for example, a CDS (Correlated Double Sampling) process, an AGC (Automatic Gain Control) process, and the like for electric signals obtained by photoelectric conversion by the imaging device 12, and further performs an A/D (Analog/Digital) conversion process. Thereafter, the imaging unit 11 outputs an imaging signal as digital data to the digital signal processing unit 20 disposed on the following stage.

Note that a structure of the imaging unit 11 in the present embodiment will be described below.

The optical system drive unit 19 drives the focus lens of the optical system 18 under control by the control unit 30 to execute a focus operation. In addition, the optical system drive unit 19 drives the diaphragm mechanism of the optical system 18 under control by the control unit 30 to execute exposure adjustment. Furthermore, the optical system drive unit 19 drives the zoom lens of the optical system 18 under control by the control unit 30 to execute a zoom operation.

The digital signal processing unit 20 is provided as an image processing processor such as a DSP (Digital Signal Processor), for example. The digital signal processing unit 20 performs various types of signal processing for digital signals (captured image data) received from the imaging unit 11.

The digital signal processing unit 20 according to the present embodiment includes at least a polarized light processing unit 21 and a codec unit 22.

The polarized light processing unit 21 is an embodiment of an "image forming unit" of the present technology, and forms a plurality of pieces of image data as different polarized light conditions on the basis of digital signals received from the imaging unit 11. As described below, images to be formed by the polarized light processing unit 21 include an image corresponding to a predetermined polarization direction. The "image corresponding to the polarization direction" herein refers to a polarized image including a component in a single polarization direction. In other words, the "image corresponding to the polarization direction" refers to an image obtained by selectively receiving linear polarized light corresponding to a single polarization direction. Note that the "image obtained by selectively receiving linear polarized light corresponding to a single polarization direction" includes images formed by a process performed for signals obtained by the imaging unit 11, such as a virtual polarized image formed by signal processing using a function F described below.

Note that processing performed by the polarized light processing unit 21 will be again described.

The codec unit 22 performs encoding for recording or communication, for example, for image data formed by the polarized light processing unit 21.

The control unit 30 includes a microcomputer (arithmetic processing device) which includes a CPU (Central Processing Unit), a ROM (Read Only Memory), a RAM (Random Access Memory), a flash memory and the like.

The CPU executes programs stored in the ROM, the flash memory and the like to control overall operations of the imaging apparatus 1.

The RAM is used for temporarily storing data, programs and the like as a work area during various data processes performed by the CPU.

The ROM and the flash memory (non-volatile memory) are used for storing an OS (Operating System) on which the CPU controls respective units, content files such as image files, application programs for various operations, firmware, and others.

The control unit 30 thus configured controls operations of respective necessary units, such as instructions of various types of signal processing performed by the digital signal processing unit 20, an imaging operation and a recording operation in accordance with an operation by the user, a reproduction operation for recorded image files, camera operations such as zoom, focus, and exposure adjustment, and user interface operations.

The display unit 16 is a display unit presenting various types of display for the user (e.g., image capturing person), and includes, for example, a display device such as an LCD (Liquid Crystal Display), and an organic EL (Electro-Luminescence) display provided on a housing of the imaging apparatus 1. Note that the display unit 16 may include an LCD, an organic EL display or the like in the form of a so-called viewfinder.

The display unit 16 includes the display device described above, and a display driver which causes the display device to execute display. The display driver executes various types of display on the display device in response to an instruction from the control unit 30.

The operation unit 17 has an input function for receiving an input of an operation from the user, and transmits a signal corresponding to the input operation to the control unit 30.

For example, the operation unit 17 is implemented by various types of operators provided on the housing of the imaging apparatus 1, a touch panel provided on the display unit 16 or the like.

The storage unit 14 includes a non-volatile memory, for example, and functions as a storage area for storing image files (content files) such as still image data and moving image data, attribute information associated with image files, and thumbnail images.

The image files are stored in a system such as JPEG (Joint Photographic Experts Group), TIFF (Tagged Image File Format), and GIF (Graphics Interchange Format), for example.

Various actual modes of the storage unit 14 are considered. For example, the storage unit 14 may be a flash memory built in the imaging apparatus 1, or a mode which includes a memory card detachably attached to the imaging apparatus 1 (e.g., portable flash memory), and a card recording and reproduction unit achieving a recording and reproduction access to this memory card. In addition, the storage unit 14 in the mode built in the imaging apparatus 1 may be implemented as an HDD (Hard Disk Drive) or the like.

The communication unit 15 performs wired communication or wireless communication for data communication and network communication with an external device.

For example, the communication unit 15 communicates with an external display device, recording device, reproduction device or the like for communication of captured image data (still image files and moving image files).

In addition, the communication unit 15 as the network communication unit may perform communication via various types of networks such as the Internet, a home network, and a LAN (Local Area Network), for example, and achieve transmission and reception of various types of data to and from a server, a terminal or the like on the network.

1-2. Formation of Virtual Polarized Image by Signal Processing

FIG. 3 is an explanatory diagram depicting a structure of the imaging unit 11 included in the imaging apparatus 1. A part A in FIG. 3 is a schematic vertical cross-sectional diagram, while a part B in FIG. 3 is a schematic front diagram.

In the imaging unit 11, an optical member 13 is disposed on an imaging surface of the imaging device 12. The imaging device 12 includes a plurality of light receiving elements 12*a* arranged two-dimensionally (in the vertical and horizontal direction). A polarizing filter 13*a* positioned on a light receiving surface of the optical member 13 is provided for each of the light receiving elements 12*a*.

In FIG. 3B, a direction (angle) of a polarization axis of each of the polarizing filters 13*a* is schematically indicated by a double-headed arrow. As can be understood with reference to the double-headed arrow, there are provided four types of the polarizing filters 13*a* having polarized light axes different from each other by an angle of 45 deg.

It is assumed hereinafter that a direction coinciding with the horizontal direction in the surface of the figure, i.e., the horizontal direction of the imaging device 12 (horizontal line direction) coincides with the horizontal direction (horizontal line). An angle of the polarization axis indicated by a double-headed arrow in the horizontal direction is expressed as an angle of "0 deg," an angle of the polarization axis indicated by a double-headed arrow in the vertical direction is expressed as an angle of "90 deg," an angle of the polarization axis indicated by a double-headed arrow inclined upward to the right (downward to the left) is expressed as an angle of "45 deg," and an angle of the polarization axis indicated by a double-headed arrow inclined upward to the left (downward to the right) is expressed as an angle of "135 deg."

Each of the light receiving elements 12*a* (i.e., each of pixels in the present example) in the imaging device 12 selectively receives linear polarized light at an angle coinciding with a polarization axis angle of the corresponding polarizing filter 13*a* disposed on the light receiving surface.

In the present example, two (vertical)×two (horizontal) =four light receiving elements 12*a* constitute one pixel unit U. In the pixel unit U, polarization axes of the polarizing filters 13*a* on the respective light receiving elements 12*a* differ from each other by 45 deg.

A plurality of the pixel units U thus configured is arranged in the vertical direction and the horizontal direction in the imaging unit 11.

The information associated with polarized light can be obtained by using the imaging unit 11 capable of selectively receiving linear polarized lights having different polarization directions as described above.

More specifically, such a function can be obtained which expresses a relation between an angle of the polarization axis of the polarizing filter and a light reception signal value (luminance value) obtained by the light receiving element 12*a* by using a plurality of light reception signal values of linear polarized lights having different polarization directions and individually received. In other words, obtained is a function which expresses a relation between a rotation angle of the polarizing filter and a reception light signal value (luminance value) on an assumption that a captured image is obtained by receiving light via the polarizing filter which is rotatable.

The rotation angle of the polarizing filter on an assumption that a captured image is obtained by receiving light via the rotatable polarizing filter as described above will be hereinafter expressed as a "virtual filter angle." In addition, the function described above will be referred to as a "function F."

The function F is specifically provided as a cos curve. The light reception signal value obtained in a case where the virtual filter angle is any angle can be calculated using the cos curve. In other words, an image to which any polarizing filter effect has been given can be obtained.

In addition, in a case where the imaging unit 11 described above is used, a captured image which cancels separation of polarized light by the optical member 13, i.e., an image corresponding to a normal captured image which cancels the polarizing filter effect can be obtained by adding light reception signal values of two linear polarized lights having polarization directions different from each other by 90 deg.

An image corresponding to a normal captured image having no polarizing filter effect in the manner described above will be hereinafter referred to as a "cancel image."

Formation of a cancel image performed by the polarized light processing unit 21 depicted in FIG. 2, and fitting of the function F will be described with reference to FIGS. 4 to 6.

Figure 4:
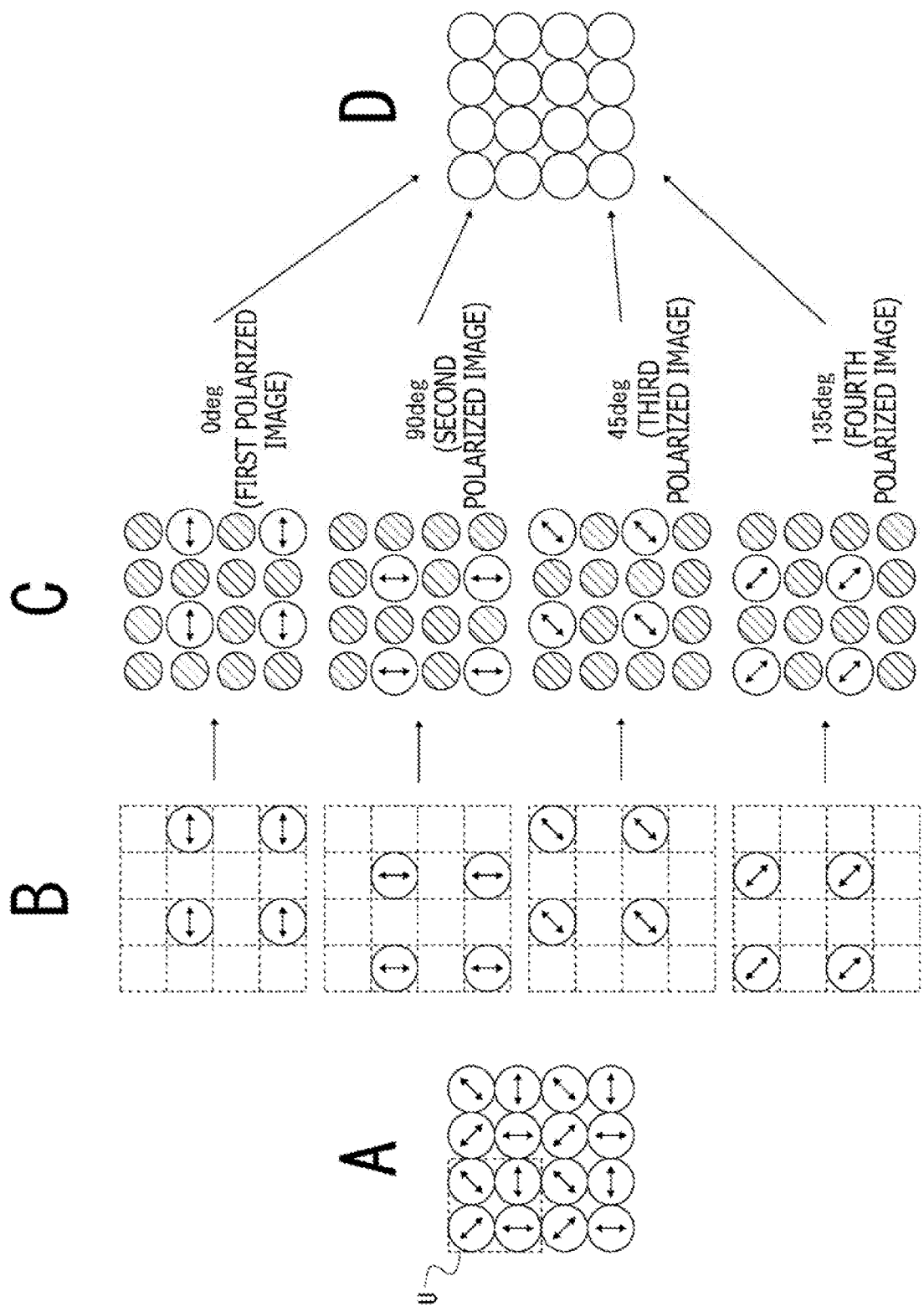
FIG. 4 is an explanatory diagram depicting a forming method of a cancel image according to embodiments.

FIG. 4 is an explanatory diagram depicting a forming method of the cancel image.

A part A in FIG. 4 schematically depicts a pixel arrangement in the imaging unit 11 together with indication of the polarization axis angles of the respective polarizing filters 13a.

As described below, it is initially assumed that light reception signal values of four types of linear polarized lights of 0 deg, 90 deg, 45 deg, and 135 deg are obtained at each pixel position in fitting of the cos curve in the present example.

Meanwhile, pixels in the polarizing filters 13a having polarization axes of 0 deg, 90 deg, 45 deg, and 135 deg in the imaging unit 11 are intermittently arranged in the vertical direction and the horizontal direction as depicted in a part B in FIG. 4. In this case, light reception signal values of the four types of linear polarized lights are difficult to obtain at each pixel position without change.

Accordingly, light reception signal values at pixel positions where corresponding light reception signal values are lacking are interpolated using light reception signal values of pixels receiving corresponding linear polarized lights for each of the linear polarized lights of 0 deg, 90 deg, 45 deg, and 135 deg as depicted in a part C in FIG. 4 to form an image corresponding to the linear polarized light of 0 deg selectively received at each pixel position (hereinafter referred to as "first polarized image"), an image corresponding to the linear polarized light of 90 deg selectively received at each pixel position (hereinafter referred to as "second polarized image"), an image corresponding to the linear polarized light of 45 deg selectively received at each pixel position (hereinafter referred to as "third polarized image"), and an image corresponding to the linear polarized light of 135 deg selectively received at each pixel position (hereinafter referred to as "fourth polarized image").

As described above, the cancel image is obtained by adding light reception signal values of two linear polarized lights having polarization directions different from each other by 90 deg at each pixel position.

More specifically, the cancel image can be obtained by adding a light reception signal value at each pixel position in the second polarized image to a light reception signal value at the same pixel position in the first polarized image, or by adding a light reception signal values at each pixel position in the fourth polarized image to a light reception signal value at the same pixel position in the third polarized image.

A part D in FIG. 4 schematically depicts that a virtual normal image is formed from the first polarized image and the second polarized image, or from the third polarized image and the fourth polarized image in this manner.

FIG. 5 is an explanatory diagram depicting fitting of the function F (cos curve). A part A in FIG. 5 depicts an example of light reception signal values (luminance values) of four linear polarized lights each obtained at a certain pixel position of the imaging unit 11, while a part B in FIG. 5 depicts an example of a relation between the four light reception signal values (luminance values) and the cos curve.

As can be seen from the part A in FIG. 5 and the part B in FIG. 5, fitting of the cos curve is achievable by obtaining light reception signal values of four linear polarized lights at each pixel position.

Figure 6:
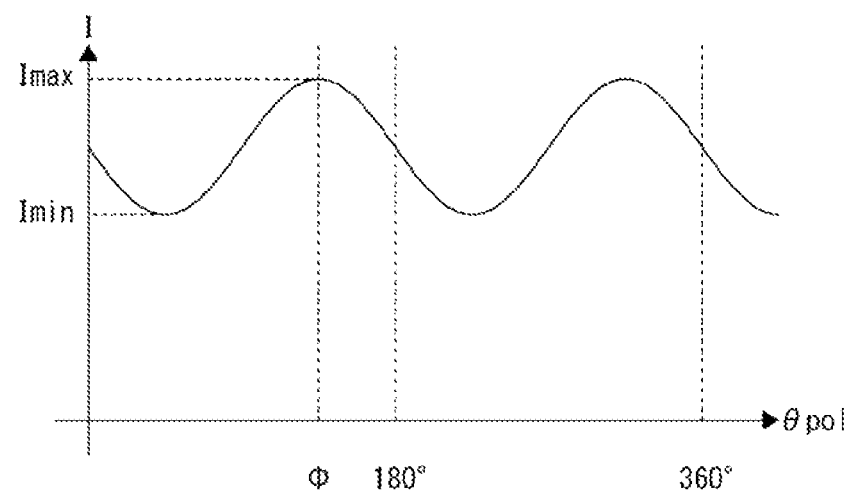
FIG. 6 is an explanatory diagram of an example of the function according to embodiments.

As depicted in FIG. 6, the cos curve as the function F is expressed as following [Equation 1] on an assumption that the light reception signal value is "I," that the maximum and minimum of the light reception signal value are "Imax" and "Imin," respectively, that a virtual filter angle is "θpol," and that an offset of "θpol" is "φ."

[Math. 1]

$$I = \frac{I_{max} + I_{min}}{2} + \frac{I_{max} - I_{min}}{2} \cos(2\theta_{pol} - 2\phi) \qquad \text{Equation 1}$$

In this case, Equation 1 can be converted into following Equation 2.

[Math. 2]

$$y = A\cos((\pi/2)*n - 2\varphi) + c \quad n = 0,1,2,3 \qquad \text{Equation 2}$$

In Equation 2, "A" indicates an amplitude, "φ" indicates a phase deviation from the origin, and "c" is an offset of "y."

Fitting of the cos curve is performed by a least-square method based on following "Equation 3" using four light reception signal values obtained from received linear polarized lights of 0 deg, 90 deg, 45 deg, and 135 deg. In other words, "y" producing a minimum "J" is obtained.

[Math. 3]

$$J = \Sigma\{(I_n - y)^2\} \qquad \text{Equation 3}$$

In Equation 3, "In" is a measured value, i.e., a light reception signal value of the linear polarized light of 0 deg, 90 deg, 45 deg, or 135 deg obtained at a target pixel position.

The value "y" producing the minimum "J" obtained by above Equation 3 becomes the cos curve fitted to the measured value.

After the cos curve is fitted, a light reception signal value (luminance value at the target pixel position) produced when the light receiving element 12a receives light via the polarizing filter at any rotation angle is obtained at the target pixel position by substituting a value of any virtual filter angle for the cos curve. Note that an item corresponding to the "virtual filter angle" in Equation 2 is "(π/2)*n."

An image corresponding to an image obtained by imaging using the imaging device 12 via the polarizing filter at any rotation angle can be obtained by performing fitting of the cos curve as described above, and calculation of a luminance value using the cos curve and any virtual filter angle for each pixel position.

An image formed on the basis of the cos curve fitted as described above, and any virtual filter angle will be hereinafter referred to as a "virtual polarized image."

The polarized light processing unit 21 is capable of forming the virtual polarized image at any virtual filter angle, and forming the cancel image cancelling the polarizing filter effect on the basis of light reception signal values of the respective light receiving elements 12a by using the method described above.

Note that the example which forms the first polarized image, the second polarized image, the third polarized image, and the fourth polarized image as interpolation images to prevent lowering of the resolution of the virtual polarized image has been described by way of example.

However, fitting of the cos curve based on four types of light reception signal values may be performed for each of the pixel units U considering that the pixel unit U is located at the same pixel position.

In addition, fitting of the cos curve is not required to be achieved using light reception signal values of four types of linear polarized light for each pixel position, but may be achieved using light reception signal values of at least three types of linear polarized light. In the present example, highly accurate fitting having higher noise resistance is achieved by performing fitting on the basis of the least-squares method using light reception signal values of four types of linear polarized light for each pixel position.

1-3. Image Acquisition Method in First Embodiment

As understood from the above description, the polarized light processing unit 21 is capable of forming the virtual polarized image and the cancel image by signal processing on the basis of signals obtained by the common imaging unit 11. In the present example, these virtual polarized image and the cancel image are formed on the basis of light reception signals of the respective light receiving elements 12a of the imaging unit 11 obtained in the same frame period (light reception signals of the respective light receiving elements 12a obtained in the same exposure period). In this sense, the virtual polarized image and the cancel image are simultaneously formed in the present example.

Note that the concept of the term "simultaneously" herein may include frame errors within a predetermined number of frames. However, the respective images are preferably formed in the same frame.

An image presenting the transparent part 5a and an image presenting the opaque part 5b can be obtained for the object 5 including the transparent part 5a and the opaque part 5b by forming the virtual polarized image and the cancel image described above.

Figure 7:
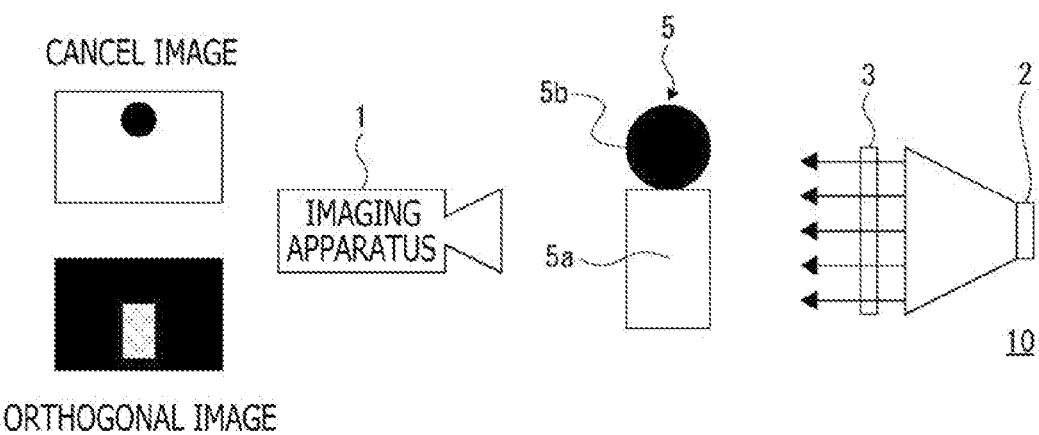
FIG. 7 is an explanatory diagram depicting an image acquisition method according to the first embodiment.

FIG. 7 is an explanatory diagram depicting this point.

It is assumed that the imaging apparatus 1 in the imaging system 10 images the object 5 to which linear polarized light from the polarized backlight constituted by the light emission unit 2 and the polarizing filter 3 is applied from the rear, and that a cancel image is formed on the basis of the captured image.

In this case, the cancel image does not present the transparent part 5a (at least clearly), but presents the opaque part 5b as depicted in the figure. The cancel image is an image which cancels the polarizing filter effect. Accordingly, the cancel image becomes a substantially all white image if the object 5 is absent. The opaque part 5b is a shielding object which shields light emitted from the polarized backlight as viewed from the imaging apparatus 1, and therefore is presented like a shadow portion in the cancel image. In contrast, the transparent part 5a transmits light from the polarized backlight. Accordingly, the transparent part 5a does not produce a shadow (at least clearly) unlike the opaque part 5b, and therefore is not presented in the cancel image.

Meanwhile, it is assumed that a virtual polarized image (hereinafter referred to as "orthogonal image") obtained at a virtual filter angle corresponding to an angle substantially orthogonal to the polarization direction of the linear polarized light applied by the polarized backlight is formed on the basis of the captured image described above.

Note that the polarization direction of the linear polarized light applied by the polarized backlight can be also referred to as a polarization direction of linear polarized light entering the optical member 13. More specifically, the orthogonal image described above can be referred to as an image corresponding to an image obtained in a case where the virtual filter angle is an angle substantially orthogonal to the polarization direction of the linear polarized light entering the optical member 13.

As depicted in the figure, the orthogonal image presents not the opaque part 5b but the transparent part 5a. The virtual filter angle is the angle substantially orthogonal to the polarization direction of the linear polarized light. Accordingly, if the object 5 is absent, a substantially all black image is obtained as the orthogonal image. In a case where the object 5 is present, the orthogonal image does not present the opaque part 5b which does not originally transmit light from the polarized backlight.

In contrast, the transparent part 5a transmits light from the polarized backlight. In this case, the polarization direction of the polarized light from the polarized backlight changes by birefringence produced while the polarized light passes through the transparent part 5a. Accordingly, the polarization direction of at least a part of the polarized light having passed through the transparent part 5a does not become orthogonal with respect to the virtual filter angle used for forming the orthogonal image, wherefore a component of the transmitted light is presented in the orthogonal image. In other words, an image of the transparent part 5a is presented.

As described above, both an image presenting the transparent part 5a and an image presenting the opaque part 5b can be obtained by forming the cancel image and the orthogonal image using the signal process on the basis of the captured image obtained by the imaging unit 11.

Figure 8:
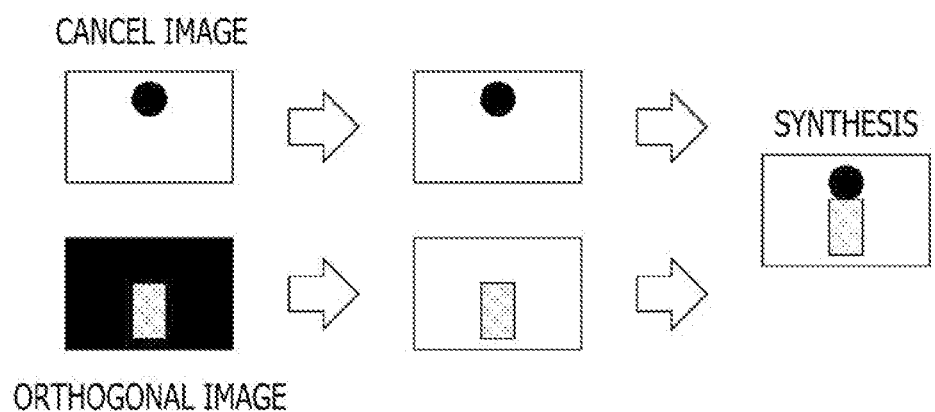
FIG. 8 is an explanatory diagram depicting synthesis of a cancel image and an orthogonal image according to the first embodiment.

As depicted in FIG. 8, the polarized light processing unit 21 of the present embodiment performs a synthesis process of synthesizing the cancel image presenting the opaque part 5b, and the orthogonal image presenting the transparent part 5a to obtain an image where the transparent part and the opaque part can be simultaneously observed.

More specifically, the polarized light processing unit 21 initially extracts an image part which presents the opaque part 5b (hereinafter referred to as "opaque part") from the cancel image. Similarly, the polarized light processing unit 21 extracts an image part which presents the transparent part 5a (hereinafter referred to as "transparent part") from the orthogonal image.

Thereafter, these extracted opaque part and transparent part are synthesized to obtain one captured image.

Note that a signal received from the imaging unit 11 as a signal on the basis of which the orthogonal image and the cancel image are formed (captured image data) may be RAW data, or a signal obtained by performing necessary signal processing for RAW data.

In addition, the "captured image (captured image data)" in the present description widely refers to an image obtained on the basis of imaging, and is used as a term indicating not only an image obtained by the imaging unit 11, but also the first polarized image to the fourth polarized image, the virtual polarized image, the cancel image and the like described above and formed from the image by performing necessary signal processing.

Moreover, "imaging" in the present description refers to operations performed until acquisition of a light reception signal by the imaging device 12.

Furthermore, concerning the polarized light from the polarized backlight, the polarization direction changes by birefringence at the transparent part 5a of the object 5 as described above. In this case, the polarization direction of a part of the polarized light from the polarized backlight changes from the original polarization direction by a change amount (change angle) of substantially 90 deg. In other words, an angle of a polarization plane of a part of the polarized light producing the change amount of substantially 90 deg substantially coincides with the virtual filter angle used for forming the orthogonal image. Accordingly, the transparent part 5*a* is presented in the orthogonal image.

Assuming in the above description that the polarization direction corresponding to the orthogonal image, i.e., the polarization direction substantially orthogonal to the polarization direction of the polarized backlight is a "second polarization direction," the imaging unit 11 of the present embodiment is also referred to as a unit for imaging the object 5 which transmits light in the second polarization direction. In other words, the object 5 in this case can be referred to as an object which has optical transparency, and light having passed through the object 5 includes light in the second polarization direction. The imaging unit 11 images this object. An image presenting the transparent part 5*a* as the orthogonal image can be obtained by performing imaging in this manner.

Note that the optical transparency refers to a characteristic which transmits at least a part of incident light.

Note that the image acquisition method in the first embodiment described above corresponds to an example which forms, from a viewpoint of a "first image" and a "second image" according to the present technology, the orthogonal image as the first image and the cancel image as the second image.

1-4. Processing Procedures

Figure 9:
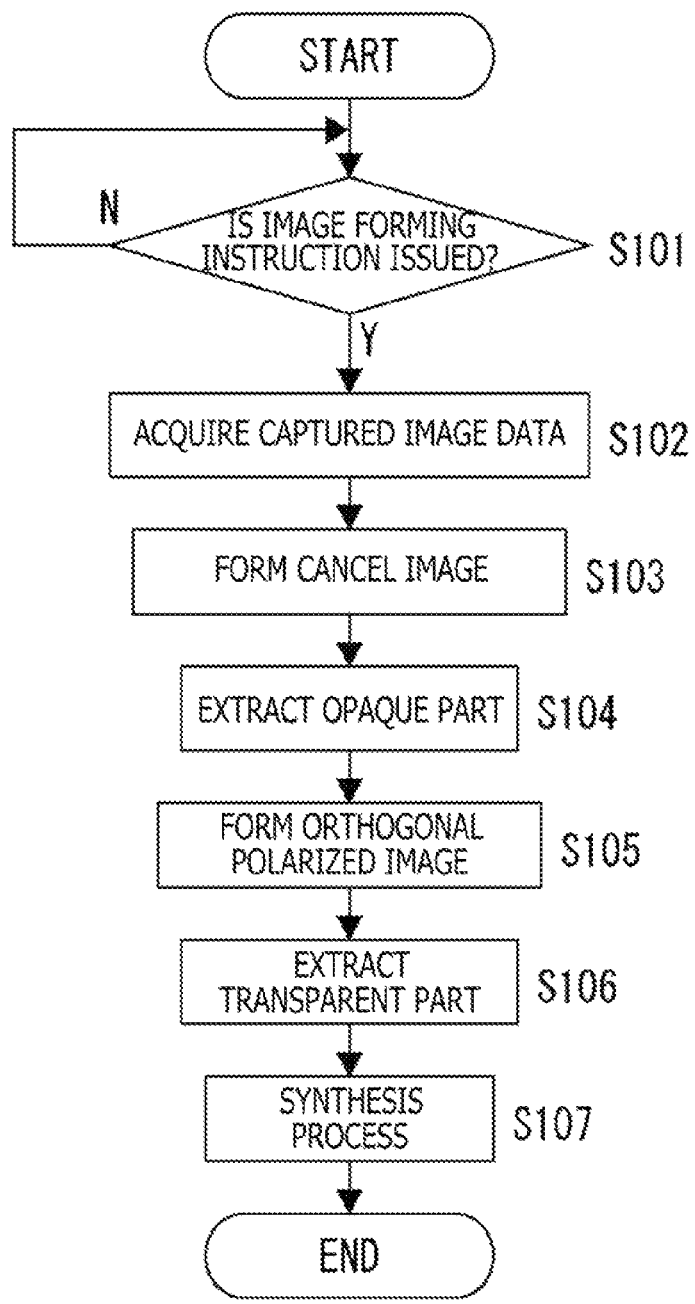
FIG. 9 is a flowchart depicting procedures of a process performed by an image forming unit to implement the image acquisition method according to the first embodiment.

FIG. 9 is a flowchart depicting procedures of a process to be performed by the polarized light processing unit 21 to implement the image acquisition method according to the first embodiment described above.

In step S101, the polarized light processing unit 21 initially checks whether or not an image forming instruction has been issued. For example, the control unit 30 depicted in FIG. 1 issues an image forming instruction to the polarized light processing unit 21 in response to a predetermined operation input via the operation unit 17. In step S101, whether or not the image forming instruction has been issued from the control unit 30 is checked in this manner, for example.

When the image forming instruction is not issued, the polarized light processing unit 21 again executes the processing in step S101. In other words, the polarized light processing unit 21 continuously executes the processing in step S101 until the image forming instruction is issued.

When the image forming instruction is issued, the polarized light processing unit 21 acquires captured image data in step S102. More specifically, captured image data for one frame obtained by the imaging unit 11 (i.e., digital sampling values of light reception signal values of the respective light receiving elements 12*a*) is obtained.

Subsequently, the polarized light processing unit 21 executes a cancel image forming process in step S103.

The cancel image forming process is performed by following procedures using the captured image data acquired in step S102, for example.

Initially, a polarized image forming process for each angle is performed. More specifically, the first polarized image, the second polarized image, the third polarized image, and the fourth polarized image described with reference to the part C in FIG. 4 are formed. Thereafter, light reception signal values of two polarized images having polarization directions orthogonal to each other are added for each pixel position. More specifically, a light reception signal value at each pixel positions in the second polarized image is added to a light reception signal value at the same pixel position in the first polarized image. Alternatively, a light reception signal value at each pixel positions in the fourth polarized image is added to a light reception signal value at the same pixel position in the third polarized image.

In this manner, a cancel image which cancels the polarizing filter effect can be obtained.

Subsequently, the polarized light processing unit 21 executes a process of extracting an image part which presents the opaque part 5*b* from the cancel image in step S104 as an opaque part extraction process.

Furthermore, the polarized light processing unit 21 executes an orthogonal image forming process in following step S105.

The orthogonal image forming process is performed by following procedures using the captured image data acquired in step S102, for example.

Initially, the cos curve is fitted for each pixel position on the basis of the first polarized image, the second polarized image, the third polarized image, and the fourth polarized image obtained in previous step S103. More specifically, the cos curve is fitted on the basis of Equation 3 described above for each pixel position using four light reception signal values obtained for each pixel position by forming the first polarized image, the second polarized image, the third polarized image, and the fourth polarized image.

Thereafter, a luminance value is calculated by substituting a predetermined virtual filter angle for the cos curve for each pixel position. The virtual filter angle used herein is an angle at which a state substantially orthogonal to (a crossed Nicol state for) the linear polarized light applied by the polarized backlight constituted by the light emission unit 2 and the polarizing filter 3 is produced. An orthogonal image is obtained in this manner. Note that the orthogonal image is also referred to as an image corresponding to an image obtained by receiving polarized light which has a polarization direction orthogonal to the polarized light applied by the polarized backlight.

Thereafter, the polarized light processing unit 21 executes a process of extracting an image part presenting the transparent part 5*a* from the cancel image in step S106 as a transparent part extraction process.

Finally, the polarized light processing unit 21 performs a process of synthesizing the extracted opaque part and transparent part into captured image data for one frame in step S107 as a synthesis process.

The polarized light processing unit 21 ends a series of the processes depicted in FIG. 9 in response to completion of step S107.

Note that the synthesis image obtained by the synthesis process in step S107 may be stored as still image data in a predetermined storage device such as the storage unit 14.

Alternatively, the synthesis image may be stored as moving image data. In a case where moving image data is formed as the synthesis image, it is sufficient if the processing in step S102 and following steps is repeatedly executed for each frame.

The process of forming the orthogonal image, such as fitting of the cos curve, is not required to be performed for each frame as long as still image data is obtained. This process may be performed only for a frame corresponding to the timing of execution of a predetermined operation.

In addition, while the case where the single light receiving element 12*a* constitutes a "pixel" of the present technology has been described by way of example for convenience of description, a color image may be formed as the captured image obtained by the imaging apparatus 1 (virtual polarized image and virtual normal image). In this case, at least the one light receiving element 12a is provided for each of red (R), green (G), and blue (B) for the "pixel" (for example, four light receiving elements 12a are provided for RGGB type). More specifically, the polarizing filter 13a is provided for each of "pixels" each having a predetermined number of the light receiving elements 12a to allow each of the "pixels" to selectively receive linear polarized light having a different polarization direction.

In a case of a color image, the respective light receiving elements 12a for R, G, and B are present for each pixel position, wherefore the first polarized image to the fourth polarized image are formed for each of R, G, and B. In addition, fitting of the cos curve performed for each pixel position of the first polarized image to the fourth polarized image, and formation of the orthogonal image based on the cos curve are performed for each of R, G, and B. In this manner, an orthogonal image having a light reception signal value (luminance value) for each of R, G, and B can be obtained for each pixel position. In addition, the cancel image is similarly formed for each of R, G, and B on the basis of the first polarized image to the fourth polarized image for each of R, G, and B.

While the example which uses the function F for forming the orthogonal image has been described herein by way of example, the function F is not required to be used to form the orthogonal image.

For example, if any one of the light receiving elements 12a of 0 deg, 90 deg, 45 deg, and 135 deg of the imaging unit 11 can receive polarized light which has a polarization direction substantially orthogonal to the polarized backlight, an image corresponding to the orthogonal image can be obtained using a light reception signal of the corresponding light receiving element 12a without change. In this case, the disposition posture of the imaging apparatus 1 (imaging unit 11) is adjusted such that any one of the light receiving elements 12a of 0 deg, 90 deg, 45 deg, and 135 deg can receive the substantially orthogonal polarized light.

A processing load for forming the orthogonal image can be reduced by eliminating the necessity of the function F.

From a viewpoint of a "first polarization direction" and a "second polarization direction" of the present technology, the method for obtaining the orthogonal image without using the function F as described above is also referred to as a method for equalizing the first polarization direction and the second polarization direction into an identical direction. More specifically, in a case where the imaging unit 11 is considered to include a first pixel group containing pixels capable of receiving light in the first polarization direction, and where the polarized light processing unit 21 (image forming unit) is considered to form a first image corresponding to the second polarization direction as a predetermined polarization direction on the basis of signals of a pixel group containing at least the first pixel group, the above method can be also referred to as a method for equalizing the first polarization direction and the second polarization direction into an identical direction.

The first polarization direction and the second polarization direction described above may be different directions herein.

In a case where the first polarization direction and the second polarization direction are different directions, an image corresponding to a polarization direction different from the first polarization direction (i.e., polarization direction of linear polarized light receivable by the first pixel group) can be obtained as the first image such as the orthogonal image, for example. In other words, for obtaining the first image, the necessity of equalizing the polarization direction corresponding to the first image and the polarization direction of linear polarized light receivable by the first pixel group is eliminated.

In this case, the function F needs to be used to form the first image. However, the degree of freedom of the disposition posture of the imaging apparatus 1 (imaging unit 11) in obtaining the first image can improve.

2. Second Embodiment 2-1. Configuration Outline of Imaging System

A configuration example of an imaging system 10A according to a second embodiment will be next described with reference to FIG. 10.

Note that parts similar to the parts already described are given identical reference numbers and identical step numbers in the following description, and the same description is not repeated.

Figure 10:
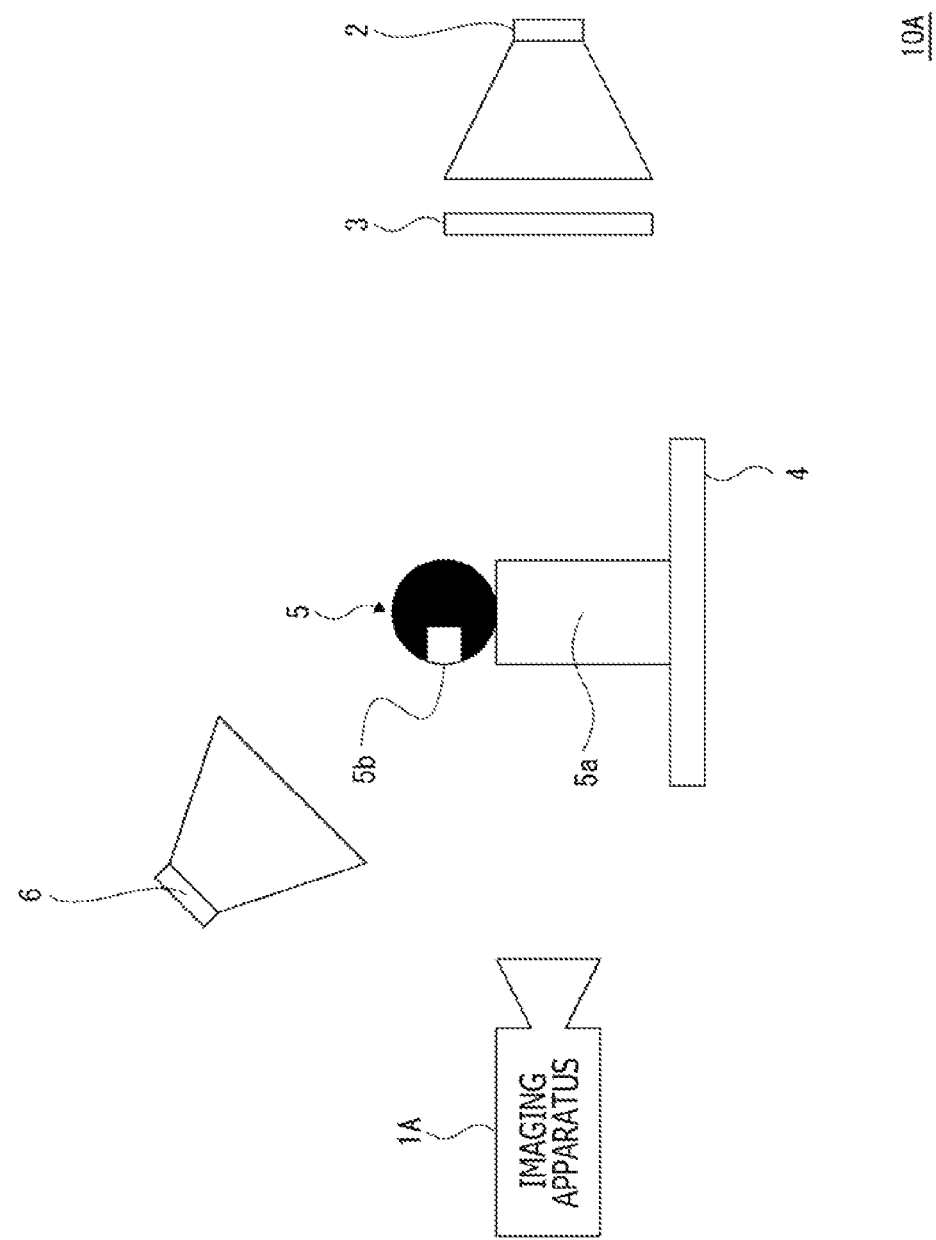
FIG. 10 is a diagram depicting a configuration example of an imaging system according to a second embodiment.

The imaging system 10A in FIG. 10 is different from the imaging system 10 in that an imaging apparatus 1A is provided in place of the imaging apparatus 1, and that a light emission unit 6 is added.

The light emission unit 6 applies light to the object 5 from the front side of the object 5 as viewed from the imaging apparatus 1A. The light emission unit 6 herein includes a necessary light emission element as a light source, such as an LED, a fluorescent light, and an incandescent light bulb, for example. Emission light from the light emission unit 6 is non-polarized light (natural light) similarly to the emission light from the light emission unit 2. From this viewpoint, the second light emission unit 6 will be hereinafter also referred to as "normal lighting."

According to the imaging system 10A described above, the imaging apparatus 1A images the front surface side of the object 5 to which non-polarized light is applied from the front side, and to which polarized light is applied from the rear surface side.

Note that an internal configuration of the imaging apparatus 1A is substantially similar to the internal configuration of the imaging apparatus 1, wherefore description with reference to the figure is omitted.

2-2. Image Acquisition Method in Second Embodiment

Figure 11:
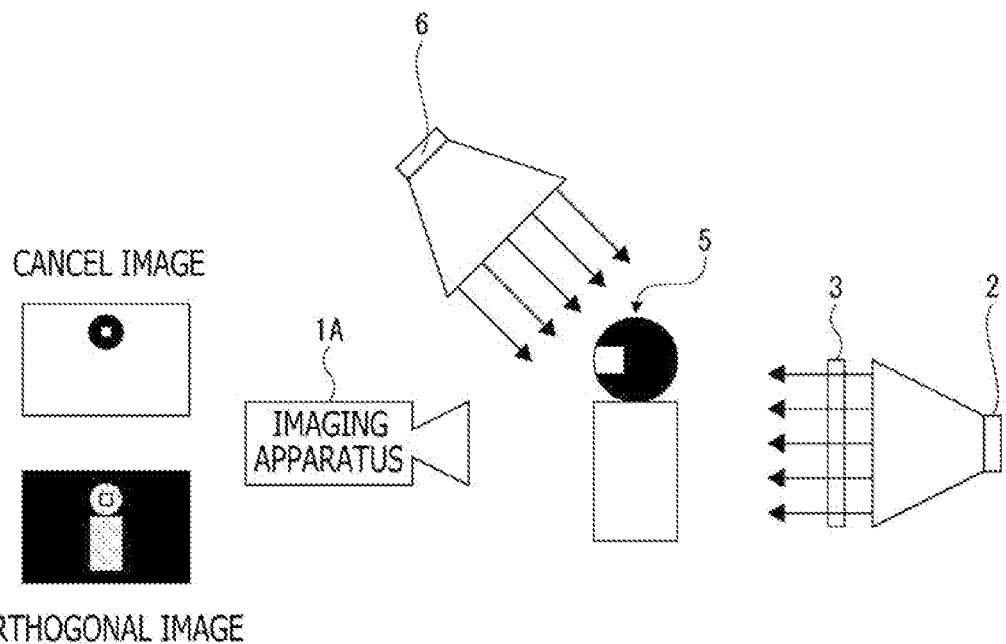
FIG. 11 is an explanatory diagram depicting an action performed when an object is imaged by an imaging apparatus of the second embodiment.

An action during imaging the object 5 by the imaging apparatus 1A of the second embodiment will be described with reference to FIG. 11.

In the second embodiment, non-polarized light from the normal lighting is applied to the object 5 from the front side. In this case, reflection light of the non-polarized light is guided from the surface of the front side of the opaque part 5b toward the imaging apparatus 1A. Accordingly, when a cancel image is formed on the basis of a captured image of the imaging unit 11, the cancel image in this case presents the opaque part 5b expressing the surface state. In contrast, substantially no reflection of the non-polarized light from the normal lighting is produced by the transparent part 5a, wherefore a cancel image in this case does not present the transparent part 5a.

In addition, when an orthogonal image is formed in this case, the orthogonal image presents the transparent part 5a by a principle similar to the corresponding principle of the first embodiment. In addition, the orthogonal image in this case presents the opaque part 5b while expressing the surface state in a mode of luminance different from the luminance presented in the cancel image as depicted in the figure.

This state is produced because a part of reflection light produced when the non-polarized light by the normal lighting is reflected on the surface of the opaque part 5b is guided toward the imaging apparatus 1A as linear polarized light having a polarization direction coinciding with the virtual filter angle used for formation of the orthogonal image.

According to the imaging apparatus 1A of the second embodiment, the polarized light processing unit 21 forms a synthesis image by synthesizing the transparent part and the opaque part on the basis of the orthogonal image and the cancel image described above.

Figure 12:
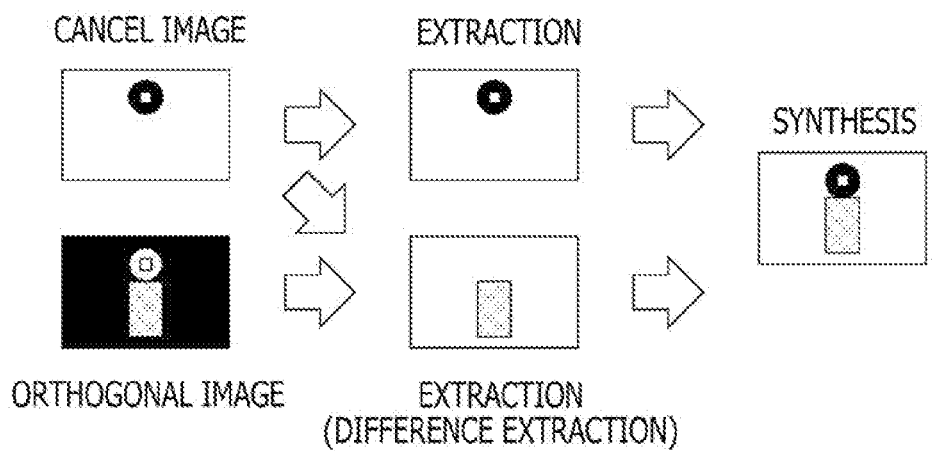
FIG. 12 is an explanatory diagram depicting image synthesis according to the second embodiment.

FIG. 12 is an explanatory diagram depicting image synthesis according to the second embodiment.

Initially, the opaque part is extracted from the cancel image similarly to the first embodiment.

In this case, the transparent part is extracted on the basis of a difference between the cancel image and the orthogonal image. More specifically, it is considered that this extraction is achieved by a process of extracting an image part having a certain value or more of a difference between the cancel image and the orthogonal image, for example.

The polarized light processing unit 21 synthesizes the extracted opaque part and transparent part in the manner described above to obtain one captured image.

2-3. Processing Procedures

Figure 13:
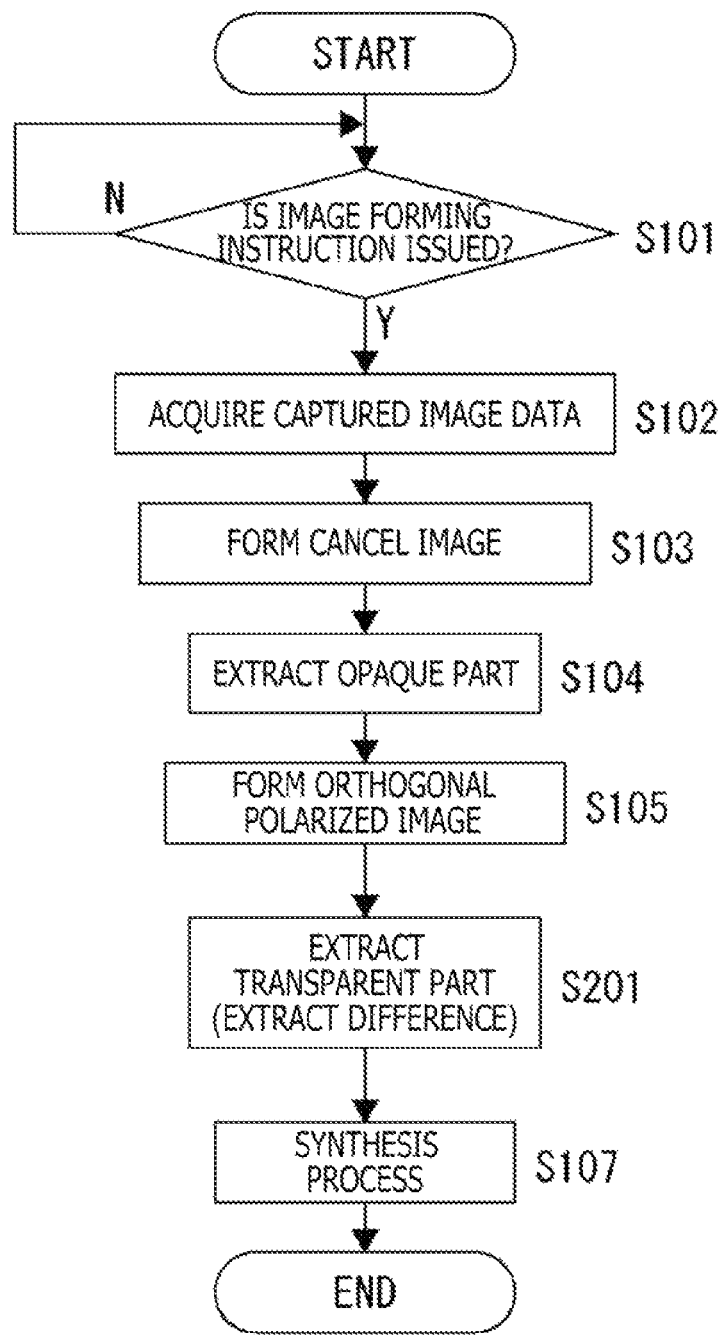
FIG. 13 is a flowchart depicting procedures of a process performed by an image forming unit to implement an image acquisition method according to the second embodiment.

FIG. 13 is a flowchart depicting procedures of a process to be performed by the polarized light processing unit 21 to implement an image acquisition method according to the second embodiment.

This process is different from the process described above with reference to FIG. 7 is that an extraction process in step S201 is executed in place of the extraction process in step S106.

In step S201, the polarized light processing unit 21 performs a process of extracting the transparent part on the basis of the difference between the cancel image and the orthogonal image formed in step S103 and step S105, respectively, as a transparent part extraction process.

More specifically, this extraction is achieved by a process of extracting an image part having a certain value or more of a difference between the cancel image and the orthogonal image as described above. Alternatively, it is also considered that the extraction is achieved by a process of extracting an image part having a certain value or more of a difference from an image part other than an image part corresponding to the opaque part by using an extraction result of the opaque part from the cancel image in step S104.

Various processing methods for extracting the transparent part in this case are considered, and any particular method is not required to be used.

According to the image acquisition method of the second embodiment, an image to be obtained as a synthesis image is such an image where the transparent part 5a and the opaque part 5b of the object 5 can be simultaneously observed, and where the surface of the object 5 is expressible.

3. Third Embodiment 3-1. System Configuration Outline

A third embodiment is an example assuming application to a copying machine.

Figure 14:
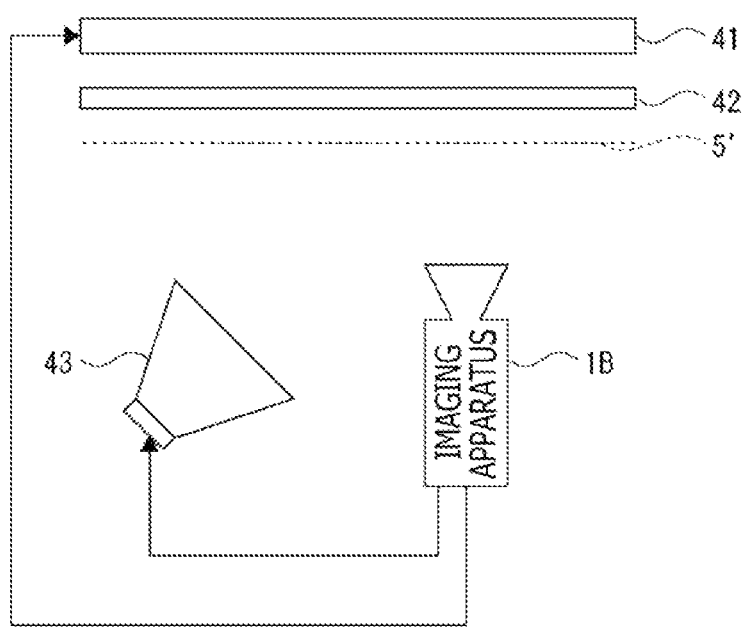
FIG. 14 is a diagram depicting a configuration example of an imaging system according to a third embodiment.

FIG. 14 depicts a configuration example of an imaging system 10B according to the third embodiment.

The imaging system 10B includes a first light emission unit 41, a polarizing filter 42, a second light emission unit 43, and an imaging apparatus 1B.

Each of the first light emission unit 41 and the second light emission unit 43 includes a necessary light emission element as a light source, such as an LED, a fluorescent light, and an incandescent light bulb, and emits non-polarized light as emission light.

The first light emission unit 41 applies light toward the imaging apparatus 1B via the polarizing filter 42. An object 5' such as a copy source sheet and copy paper is disposed between the imaging apparatus 1B and the polarizing filter 42 in the imaging system 10B. The copy source sheet herein is a sheet where information such as an image and a character to be acquired for copying is displayed by printing or the like. In addition, the copy paper refers to paper used as a copy destination medium to which information is copied.

According to the imaging apparatus 1B, the object 5' to which polarized light emitted from the polarizing filter 42 on the rear side is applied is located at a position for imaging from the front side of the object 5'.

Note that polarized lighting constituted by the first light emission unit 41 and the polarizing filter 42 will be hereinafter also referred to as "polarized backlight."

The second light emission unit 43 applies non-polarized light to the object 5' from the front side of the object 5'.

The second light emission unit 43 will be hereinafter also referred to as "normal lighting" from the viewpoint that the second light emission unit 43 applies non-polarized light.

Figure 15:
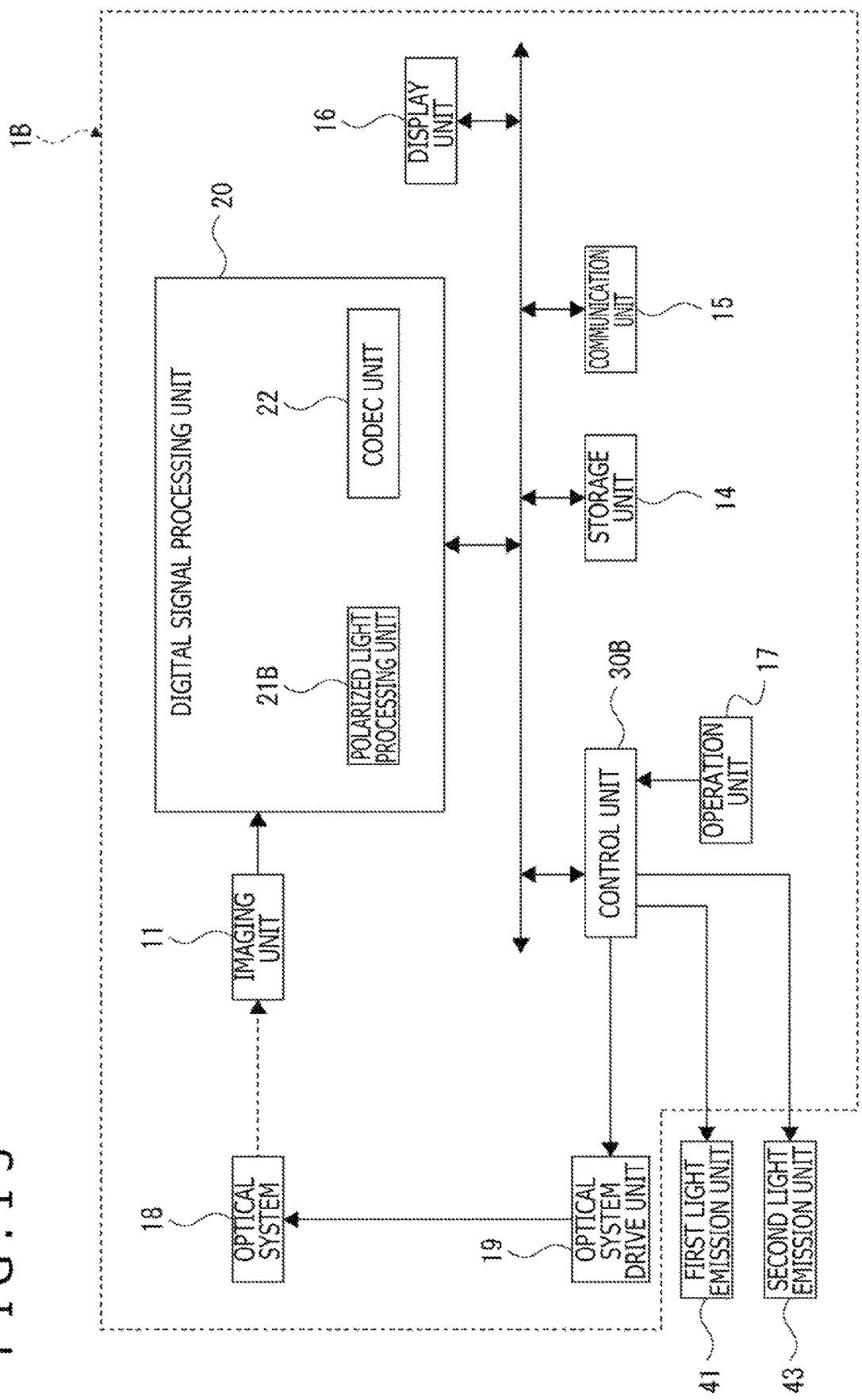
FIG. 15 is an explanatory diagram depicting an internal configuration of an imaging apparatus according to the third embodiment.

FIG. 15 is an explanatory diagram of an internal configuration of the imaging apparatus 1B, depicting the first light emission unit 41 and the second light emission unit 42 depicted in FIG. 1 as well as the internal configuration of the imaging apparatus 1B.

The imaging apparatus 1B is different from the imaging apparatus 1 in that a control unit 30B is provided in place of the control unit 30, and that a polarized light processing unit 21B is provided in place of the polarized light processing unit 21 in the digital signal processing unit 20.

According to a comparison between the control unit 30B and the control unit 30, the control unit 30B is different from the control unit 30 in that the control unit 30B performs light emission control of the first light emission unit 41 and the second light emission unit 43, and performs following processing of the third embodiment.

In addition, the polarized light processing unit 21B is different from the polarized light processing unit 21 in that the polarized light processing unit 21B performs following processing of the third embodiment.

3-2. Corresponding Method for Transparent Sheet and Opaque Sheet

The imaging apparatus 1B according to the third embodiment performs various processes corresponding to a case where a mixture of a transparent sheet and an opaque sheet is used as the copy source sheet or the copy paper described above.

Accordingly, the polarized light processing unit 21B of the imaging apparatus 1B forms a parallel image as well as the cancel image and the orthogonal image described above.

The parallel image is a virtual polarized image obtained in a case where the virtual filter angle becomes an angle at which a substantial parallel state with the polarization direction of the linear polarized light applied by the polarized backlight is produced. In other words, the parallel image is an image corresponding to an image obtained by selectively receiving linear polarized light which has a polarization direction substantially coincident with the polarization direction of the linear polarized light applied by the polarized backlight.

Characteristics of the cancel image, the orthogonal image, and the parallel image obtained in a case where the imaging apparatus 1B of the imaging system 10B images the object 5' will be considered with reference to FIGS. 16 to 18.

FIG. 16 depicts an example of the object 5' assumed in the following description.

The object 5' in this case is a sheet. It is assumed that information indicated as "5'a" in the figure is displayed on the sheet surface by printing or the like. The display information on the object 5' as a sheet in this manner will be hereinafter referred to as "sheet display information 5a'."

FIG. 17 depicts an example of the cancel image (part A in FIG. 17), the orthogonal image (part B in FIG. 17), and the parallel image (part C in FIG. 17) obtained in a case where a transparent sheet as the object 5' is imaged.

More specifically, the part A in FIG. 17, the part B in FIG. 17, and the part C in FIG. 17 depict the cancel image, the orthogonal image, and the parallel image, respectively, obtained in a state where the polarized backlight is applied (normal lighting is in an off-state).

Note that it is assumed in FIG. 17 that imaging is performed in a state where the object 5' as a sheet is inclined to an imaging frame of the imaging apparatus 1B. Note that this point is also applicable to FIG. 18 referred to below.

The cancel image depicted in the part A in FIG. 17 is obtained as an image where the sheet display information 5'a is presented on a substantially white background.

In addition, obtained as the orthogonal image depicted in the part B in FIG. 17 is an image where a contour of the object 5' and the sheet display information 5'a are presented on a substantially black background. In this case, a region other than the portion where the sheet display information 5'a is displayed in the object 5' presented in the orthogonal image is substantially gray. In other words, the portion where the transparent part of the object 5' as the transparent sheet is presented is substantially gray. This state is produced by a change of the polarization direction of illumination light of the polarized backlight as a result of birefringence in the transparent part.

Furthermore, the parallel image depicted in the part C in FIG. 17 is similar to the cancel image in the part A in FIG. 17 in the point that the sheet display information 5'a associated with the object 5' is presented on a substantially white background. However, the parallel image in the part C in FIG. 17 includes the contour of the object 5', and the transparent part of the object 5' as a substantially gray portion presented in the image similarly to the part B in FIG. 17.

FIG. 18 depicts an example of the cancel image (part A in FIG. 18), the orthogonal image (part B in FIG. 18), and the parallel image (part C in FIG. 18) obtained in a case where an opaque sheet as the object 5' is imaged.

However, the cancel image depicted in the part A in FIG. 18 is an image obtained by applying normal lighting (the polarized backlight is in an off-state). The orthogonal image and the parallel image in the parts B and C in FIG. 18, respectively, are images obtained in a state where the polarized backlight is in the lighting state similarly to the cases of the parts B and C in FIG. 17.

In a case where the object 5' is an opaque sheet, the cancel image is obtained using the normal lighting in the lighting state. In this case, an image presenting the sheet display information 5'a on a substantially white background as depicted in the part A in FIG. 18 is obtained.

A substantially all black image depicted in the part B in FIG. 18 is obtained as the orthogonal image. This image is obtained on the basis of a principle similar to the principle that the opaque part 5b is not presented in the orthogonal image obtained by the polarized backlight in the lighting state as depicted above with reference to FIG. 7 and other figures.

Furthermore, the parallel image depicted in the part C in FIG. 18 presents a silhouette of the object 5' in substantially black on a substantially white background. This image is produced by the opaque sheet blocking the illumination light from the polarized backlight as viewed from the imaging apparatus 1B side.

The imaging apparatus 1B of the third embodiment determines whether or not the object 5' is a transparent sheet or an opaque sheet, extracts a contour of the sheet, and detects an inclination of the sheet by utilizing the characteristics of the cancel image, the orthogonal image, and the parallel image described above.

More specifically, the determination of the transparent sheet or the opaque sheet is made on the basis of the orthogonal image obtained with the polarized backlight in the lighting state by utilizing the characteristics described with reference to the part B in FIG. 17 and the part B in FIG. 18. More specifically, this determination is made on the basis of determination of whether or not the orthogonal image is an all black image.

In addition, the extraction of the sheet contour is performed in a following manner for each of the transparent sheet and the opaque sheet. More specifically, the extraction is performed for the transparent sheet on the basis of the orthogonal image (part B in FIG. 17) or the parallel image (part C in FIG. 17) with the polarized backlight in the lighting state.

In addition, the extraction is performed for the opaque sheet on the basis of the parallel image (part C in FIG. 18) with the polarized backlight in the lighting state.

The detection of the sheet inclination is performed on the basis of sheet contour information extracted by the method described above.

3-3. Processing Example

In an application to a copying machine considered herein, it is assumed that the sheet determination, the contour extraction, and the inclination detection described above are performed when the sheet display information 5'a on the object 5' as a copy source sheet is acquired as a captured image, and copied to copy paper to obtain a copy of the acquired sheet display information 5'a.

A process performed at the time of acquisition of the sheet display information 5'a for copying will be hereinafter described with reference to a flowchart in FIG. 19.

Figure 19:
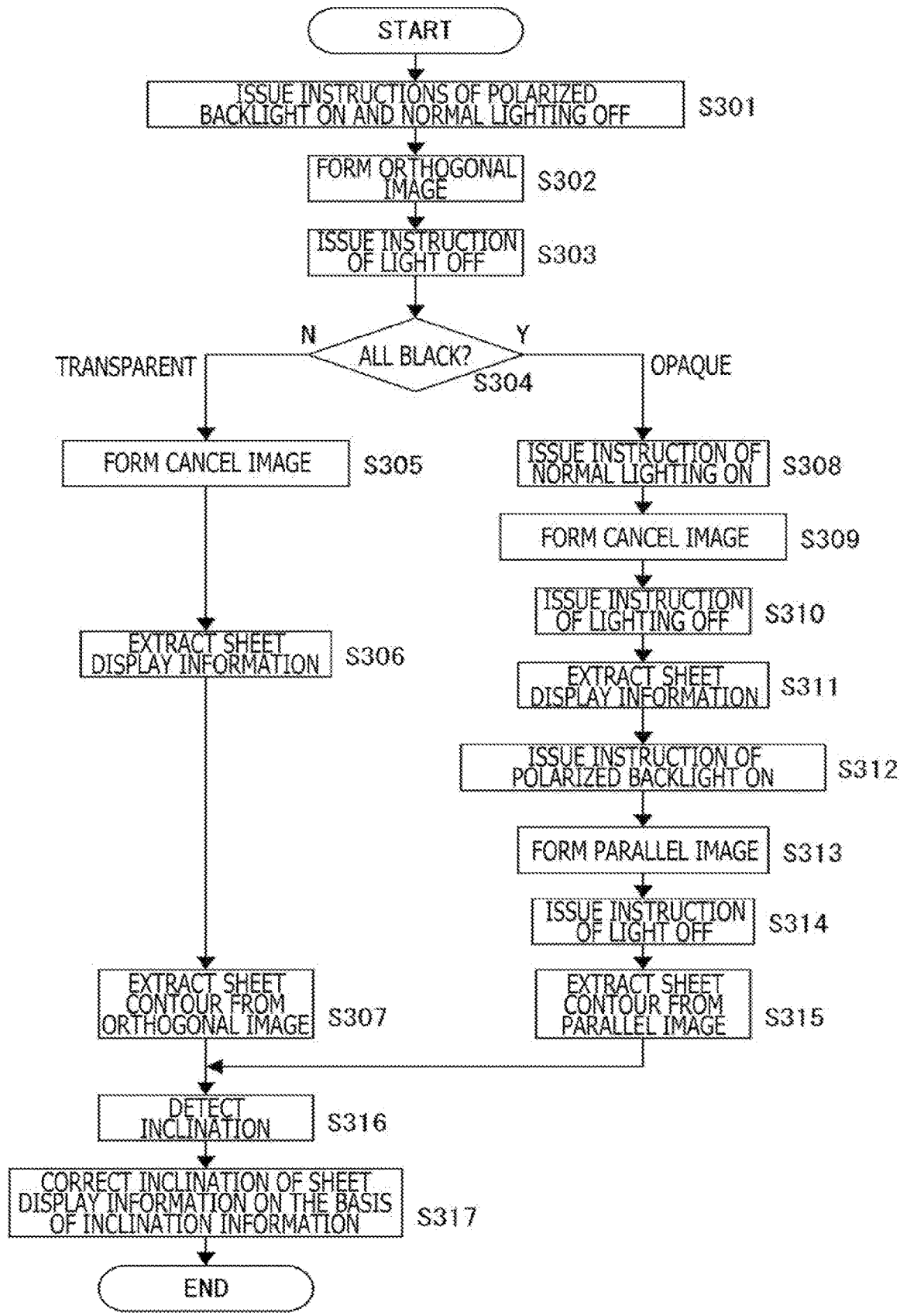
FIG. 19 is a flowchart depicting procedures of a process performed by an image forming unit at the time of acquisition of sheet display information.

FIG. 19 depicts procedures of a process performed by the polarized light processing unit 21B at the time of acquisition of the sheet display information 5'a.

It is assumed that the object 5' as the copy source sheet where the sheet display information 5'a is displayed is set at a position for imaging by the imaging apparatus 1B in the imaging system 50B at a start of the process depicted in FIG. 19.

In step S301 in FIG. 19, the polarized light processing unit 21B issues, to the control unit 30B, instructions of turning on the polarized backlight and turning off the normal lighting.

As a result, the first light emission unit 41 is turned on, while the second light emission unit 43 is turned off. Accordingly, produced is such a state that illumination light of the polarized backlight is applied to the object 5', and that illumination light of the normal lighting is applied to the object 5'.

Subsequently, the polarized light processing unit 21B forms an orthogonal image in step S302, and issues an instruction of turning off the polarized backlight (light off instruction) to the control unit 30B in step S303.

Thereafter, the polarized light processing unit 21B determines whether or not the image is an all black image in step S303. More specifically, the polarized light processing unit 21B determines whether or not an overall luminance value of the orthogonal image obtained in step S302 is a predetermined luminance value or smaller. This determination corresponds to determination of whether or not the object 5' is an opaque sheet. For example, it is determined whether or not each luminance value of predetermined pixels, such as all pixels of the orthogonal image, is a certain value or smaller. Alternatively, it may be determined whether or not an average of the luminance values of the orthogonal image is a certain value or smaller. Various methods of determining whether or not the image is an all black image are considered and adopted without limitation to any particular method as long as determination of the transparent sheet or the opaque sheet can be made.

In a case where the polarized light processing unit 21B determines that the image is not an all black image in step S304, the polarized light processing unit 21B executes processes associated with extraction of the sheet contour and detection of sheet inclination of the transparent sheet in steps continuing from step S305.

Initially, the polarized light processing unit 21B forms a cancel image in step S305. This process is similar to the process in step S103 in FIG. 9 described above.

Subsequently, the polarized light processing unit 21B executes a process of extracting the sheet display information 5'a in step S306. More specifically, the polarized light processing unit 21B performs a process of extracting an image part presenting the sheet display information 5'a from the cancel image.

Moreover, the polarized light processing unit 21B executes a process of extracting the sheet contour from the orthogonal image in subsequent step S307. More specifically, the polarized light processing unit 21B extracts the contour formed by the object 5' as the transparent sheet and presented in the orthogonal image on the basis of the orthogonal image obtained in step S302 (corresponding the mode in the part B in FIG. 17 in this case). For example, for extracting the contour in this case, it is considered that edges detected on the outermost side from the image center are detected by edge detection, and connected in a rectangular shape.

In response to completion of the extraction process in step S307, the polarized light processing unit 21B proceeds to step S316, and detects the inclination of the object 5' on the basis of the extracted contour information to perform the inclination detection process.

Furthermore, in subsequent step S317, the polarized light processing unit 21B corrects the inclination of the extracted sheet display information 5'a (extracted in step S306 or in step S311 to be described below) on the basis of inclination information, i.e., inclination information associated with the object 5' detected in step S316. More specifically, an image rotation process is performed for image data as the sheet display information 5'a in such a manner as to cancel the detected inclination.

In contrast, in a case where the image is determined to be an all black image in step S304 described above, the polarized light processing unit 21B executes processes associated with extraction of the sheet contour and inclination detection of the opaque sheet in steps continuing from step S308.

More specifically, the polarized light processing unit 21B issues an instruction of turning on the normal lighting to the control unit 30B in step S308, forms a cancel image in subsequent step S309, issues an instruction of turning off the normal lighting (lighting off instruction) to the control unit 30B in step S310, and then performs a process of extracting the sheet display information 5'a in step S311. In other words, the polarized light processing unit 21B extracts an image part presenting the sheet display information 5'a from the cancel image formed in step S309 (corresponding to the mode in the part A in FIG. 18).

Furthermore, the polarized light processing unit 21B issues an instruction of turning on the polarized backlight to the control unit 30B in subsequent step S312, performs a process of forming a parallel image in step S313, and issues a light off instruction to the control unit 30B in step S314.

Subsequently, the polarized light processing unit 21B execute a process of extracting the sheet contour from the parallel image in step S315. More specifically, the polarized light processing unit 21B extracts the contour formed by the object 5' as the opaque sheet and presented in the parallel image on the basis of the parallel image obtained in step S313 (corresponding to the mode in the part C in FIG. 18). For example, for extracting the contour in this case, it is similarly considered that edges detected on the outermost side from the image center are detected by edge detection, and connected in a rectangular shape.

In response to completion of the extraction process in step S315, the polarized light processing unit 21B proceeds to step S316. In this manner, in the case of the opaque sheet, inclination correction for the sheet display information 5'a is performed similarly to the case of the transparent sheet described above.

In response to completion of the correction process in step S317, the polarized light processing unit 21B ends a series of processes depicted in the figure.

For example, it is also considered that the sheet determination is made for copy paper when the acquired sheet display information 5 is copied to copy paper, for example. In other words, there is such a case where copy paper to be used may be not only an opaque sheet but also a transparent sheet.

Hereinafter described is a case where a manual mode and an automatic selection mode is switchable in a selection mode of copy paper during copying. The manual mode is a mode where the user designates which of the opaque sheet or the transparent sheet is used as copy paper corresponding to a copying target for each case in accordance with an operation input from the user via the operation unit 17. The automatic selection mode is a mode where the imaging apparatus 1B determines which of the opaque sheet or the transparent sheet is the set copy paper for each case.

It is assumed in the following description that the user sets the manual mode or the automatic selection mode beforehand by inputting an operation input via the operation unit 17.

Figure 20:
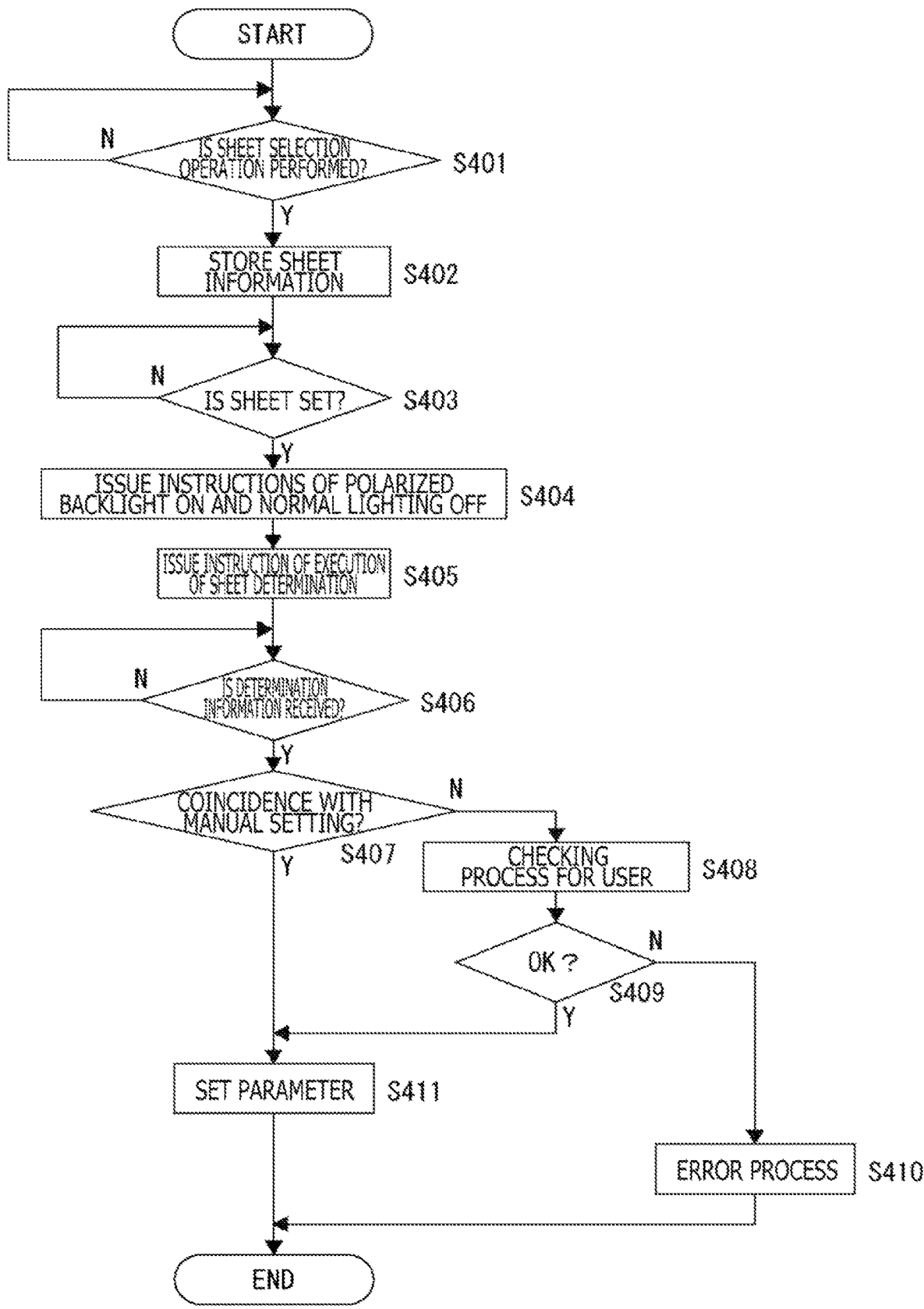
FIG. 20 is a flowchart depicting processing procedures to be performed by a control unit under setting of a manual mode according to the third embodiment.

FIG. 20 is a flowchart depicting processing procedures to be performed by the control unit 30B under setting of the manual mode.

In step S401, the control unit 30B in FIG. 20 determines whether or not an operation for selecting a sheet has been performed, i.e., whether or not an operation for selecting the opaque sheet or the transparent sheet has been performed. In a case where the sheet selection operation has not been performed, the control unit 30B repeats processing in step S401.

In a case where the sheet selection operation is received, the control unit 30B performs a process of storing information indicating the sheet selected in step S402, and then proceeds to step S403 and determines whether or not the sheet has been set. In a case where no sheet is set, the processing in step S403 is repeated until the sheet is set.

In a case where setting of the sheet has been confirmed in step S403, the control unit 30B performs a process of turning on the polarized backlight and turning off the normal lighting, i.e., a process of turning on the first light emission unit 41 and turning off the second light emission unit 43 in step S404.

Thereafter, the control unit 30B issues a sheet determination execution instruction to the polarized light processing unit 21B in step S405.

Figure 21:
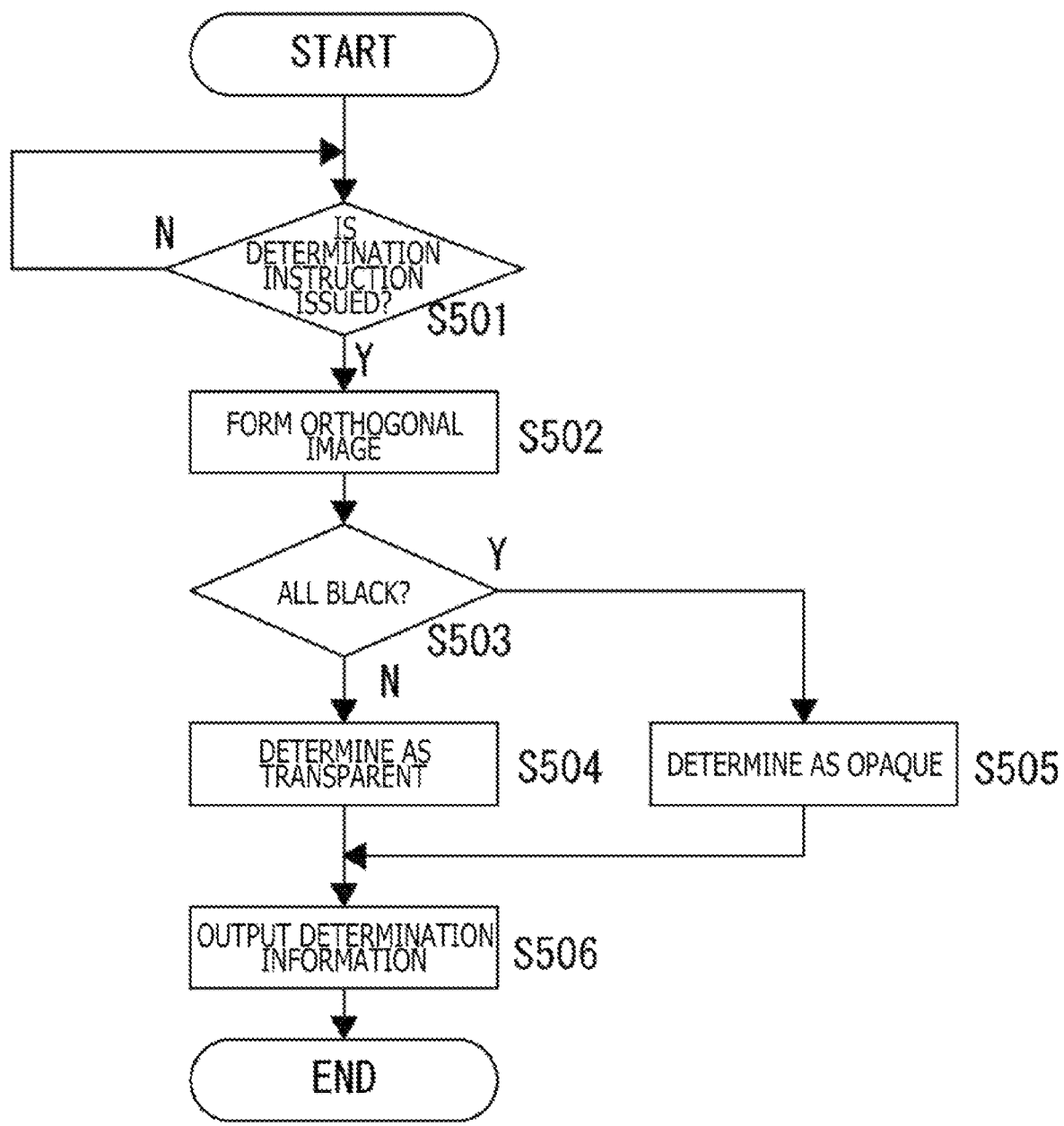
FIG. 21 is a flowchart depicting a process for sheet determination performed by an image forming unit according to the third embodiment.

A flowchart in FIG. 21 herein depicts a process executed by the polarized light processing unit 21B for the sheet determination execution instruction described above.

In step S501, the polarized light processing unit 21B waits for reception of a determination instruction from the control unit 30B, i.e., a sheet determination execution instruction. At the time of reception of the determination instruction, the polarized light processing unit 21B executes a process of forming an orthogonal image in step S502, and determines whether or not the formed orthogonal image is an all black image in step S503. These processes are similar to the processes in steps S302 and S304 in FIG. 19.

In a case where it is determined that the image is not an all black image in step S503, the polarized light processing unit 21B obtains a determination result that the sheet is a transparent sheet in step S504. In a case where it is determined that the image is an all black image, the polarized light processing unit 21B obtains a determination result that the sheet is an opaque sheet in step S505.

In response to the determination result obtained in either step S504 or step S505, the polarized light processing unit 21B performs an output process of outputting determination information, i.e., a process of outputting, to the control unit 30B, determination information indicating the determination result that the sheet is a transparent sheet or an opaque sheet in step S506, and then ends a series of processes depicted in FIG. 21.

The description returns to description with reference to FIG. 20.

The control unit 30B performs a reception waiting process of receiving the determination information described above in step S406, and determines coincidence or non-coincidence with manual settings in step S407 in a case of reception of the determination information. More specifically, it is determined whether or not the sheet type indicated by the sheet information stored in step S402 described above coincides with the sheet type indicated by the determination information received in step S406.

In a case of non-coincidence with the manual settings, the control unit 30B performs a checking process for the user in step S408. Performed in the checking process in the present example are respective issues of a notification of information indicating the type of the determined sheet, and a notification of non-coincidence with the manual settings, and reception of an operation for instructing whether to perform copying on the copy paper of the type corresponding to the notification given to the user via the display unit 16 or the like, for example.

The control unit 30B checks a response to the checking process from the user in step S409. When a response indicating that the non-coincidence is a problem is given as a result of the checking process, the control unit 30B executes an error process in step S410, and ends a series of process depicted in FIG. 20. In the error process, a notification indicating at least the presence of an error is given to the user via the display unit 16 or the like.

In contrast, when a response indicating no problem in the response described above is given, the control unit 30B performs a parameter setting process in step S411, and ends a series of processes depicted in FIG. 20. Set in the parameter setting process are predetermined parameters such as print density in accordance with the opaque sheet or the transparent sheet set as the copy paper, for example.

Figure 22:
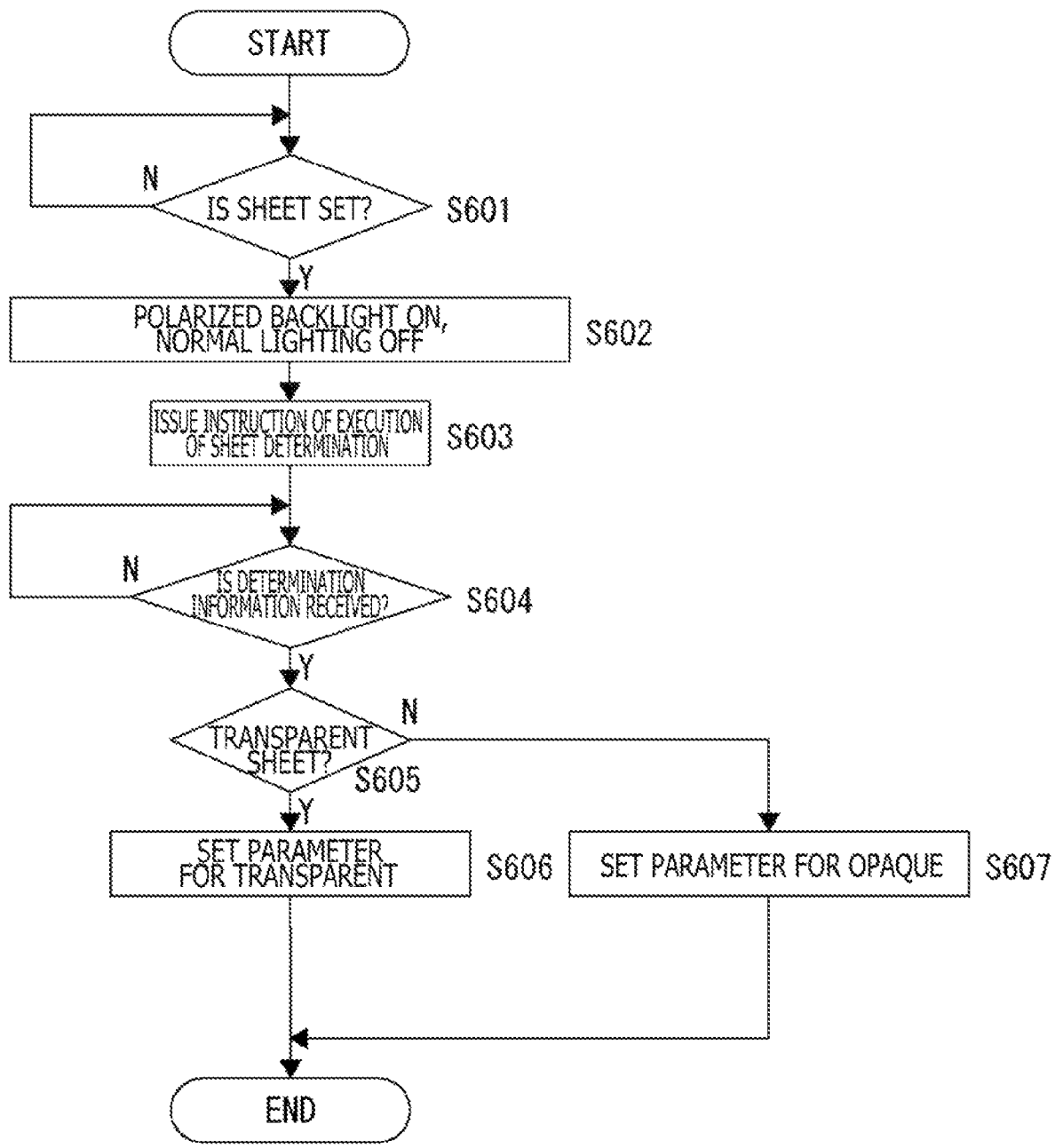
FIG. 22 is a flowchart depicting processing procedures to be performed by the control unit under setting of an automatic selection mode according to the third embodiment.

FIG. 22 is a flowchart depicting processing procedures to be performed by the control unit 30B under setting of the automatic selection mode.

In FIG. 22, the control unit 30B performs a process of waiting until the sheet is set in step S601. In a case where the sheet is set, the control unit 30B performs a process of turning on the polarized backlight and turning off the normal lighting in step S602, and then issues a sheet determination execution instruction to the polarized light processing unit 21B in step S603. In response to this sheet determination execution instruction, the polarized light processing unit 21B similarly performs the processes depicted in FIG. 21.

In step S604, the control unit 30B waits until reception of determination information from the polarized light processing unit 21B. At the time of reception of the determination information, the control unit 30B determines whether or not the sheet is a transparent sheet in step S605. In other words, the control unit 30B determines whether or not the sheet type indicated by the determination information is a transparent sheet.

In a case where the sheet is a transparent sheet in step S605, the control unit 30B proceeds to step S606, sets, for example, predetermined parameters such as print density corresponding to the transparent sheet to perform a transparent parameter setting process, and ends a series of processes depicted in FIG. 22.

In contrast, in a case where the sheet is not a transparent sheet in step S605, the control unit 30B sets, for example, predetermined parameters such as print density corresponding to the opaque sheet to perform an opaque parameter setting process in step S607, and ends a series of processes depicted in FIG. 22.

Appropriate copying setting corresponding to the transparent sheet or the opaque sheet as the copy paper can be achieved by performing the processes in FIG. 19 to FIG. 22 described above.

Note that the rotation correction may be performed by adopting a correction method which mechanically rotates the sheet as well as the rotation correction in an image processing manner as described above.

From the viewpoint of formation of the first and second images of the present technology, the third embodiment described above is considered as an embodiment which forms the orthogonal image and the parallel image as the first image, and forms the cancel image as the second image.

<4. Modified Example of Imaging Unit>

FIG. 23 is an explanatory diagram of a structure of an imaging unit 11A in a modified example. A part A in FIG. 23 is a schematic vertical cross-sectional diagram of pixel pairs 50 included in the imaging unit 11A, while a part B in FIG. 23 is a diagram depicting an arrangement of the pixel pairs 50 in the imaging unit 11A as viewed from the front.

The imaging unit 11A in the modified example includes two types of the pixel pairs 50 (hereinafter referred to as "pixel pair 50-1" and "pixel pair 50-2") as the pixel pairs 50. The pixel pair 50-1 includes a polarization splitter 51-1, a pixel 52, and a pixel 53, while the pixel pair 50-2 includes a polarization splitter 51-2, the pixel 52, and the pixel 53.

Each of the polarization splitters 51-1 and 51-2 is constituted by a splitter of a type formed by affixing two right-angle prisms in the present example, and includes a separation surface 51a disposed at a portion where these right-angle prisms are affixed to each other. In each of the polarization splitters 51-1 and 51-2, linear polarized light which is included in linear polarized light contained in incident light from and has a polarization direction substantially coincident with the polarization axis of the separation surface 51a passes through the separation surface 51a, and linear polarized light having a polarization direction substantially orthogonal to the polarization axis is reflected on the separation surface 51a.

Each of the pixels 52 and 53 includes a predetermined number of light receiving elements 12a. It is assumed that each of the pixels 52 and 53 has the one light receiving element 12a for convenience of explanation. Note that each of the pixels 52 and 53 includes the three or more light receiving elements 12a corresponding to R, G, and B in a case of imaging of color images.

According to the pixel 52 of the pixel pair 50-1, a light receiving surface of the light receiving element 12a included in the pixel 52 is substantially orthogonal to an optical axis of reflection light on the separation surface 51a of the polarization splitter 51-1, and receives the reflection light via the light receiving element 12a. In addition, according to the pixel 53 of the pixel pair 50-1, a light receiving surface of the light receiving element 12a included in the pixel 53 is substantially orthogonal to an optical axis of transmission light through the separation surface 51a of the polarization splitter 51-1, and receives the transmission light via the light receiving element 12a.

The pixel 52 and the pixel 53 of the pixel pair 50-1 thus configured selectively receive linear polarized light having different polarization directions by 90 deg.

In addition, according to the pixel 52 of the pixel pair 50-2, a light receiving surface of the light receiving element 12a included in the pixel 52 is substantially orthogonal to an optical axis of reflection light on the separation surface 51a of the polarization splitter 51-2, and receives the reflection light via the light receiving element 12a. In addition, according to the pixel 53 of the pixel pair 50-2, a light receiving surface of the light receiving element 12a included in the pixel 53 is substantially orthogonal to an optical axis of transmission light through the separation surface 51a of the polarization splitter 51-2, and receives the transmission light via the light receiving element 12a.

The pixel 52 and the pixel 53 of the pixel pair 50-2 thus configured also selectively receive linear polarized light having different polarization directions by 90 deg.

The pixel pair 50-1 and the pixel pair 50-2 are alternately and two-dimensionally arranged in the imaging unit 11A. In addition, according to the pixel pair 50-1 and the pixel pair 50-2 disposed adjacent to each other, the in-plane angle of the polarization axis of the separation surface 51a in the polarization splitter 51-1, and the in-plane angle of the polarization axis of the separation surface 51a in the polarization splitter 51-2 are different from each other. More specifically, the in-plane angles of these polarization axes are different from each other by 45 deg in the present example.

In this case, the pixels 52 and 53 of the pixel pair 50-1, and the pixels 52 and 53 of the pixel pair 50-2 selectively receive linear polarized lights having polarization directions different by 45 deg for each.

As depicted in the part B in FIG. 23, the pixel pair 50-1 and the pixel pair 50-2 disposed adjacent to each other constitute one pixel unit U' in the present example. A plurality of the pixel units U' thus configured is arranged in the vertical direction and the horizontal direction in the imaging unit 11A.

Note that the polarization directions of the linear polarized lights selectively received by the respective pixel pairs 50 in the part B in FIG. 23 are expressed in a manner similar to the manner of the double-headed arrows indicating the directions of the polarization axes of the polarizing filter 13a in the part B in FIG. 3 described above.

FIG. 24 is an explanatory diagram depicting a forming method of a first polarized image to a fourth polarized image and a virtual normal image formed in a case of use of the imaging unit 11A in a manner similar to the manner of FIG. 4 described above.

The imaging unit 11A is capable of receiving two linear polarized lights having polarization directions orthogonal to each other in each of the pixel pairs 50, i.e., at each of pixel positions. Accordingly, resolution senses of the first polarized image to the fourth polarized image are allowed to improve (see parts B and C in FIG. 4 and parts B and C in FIG. 24) more than a case where the imaging unit 11 is used (see FIG. 4). Note that the resolution is allowed to improve in a case where the first polarized image to the fourth polarized image are formed without pixel interpolation considering that two (vertical)×two (horizontal)=four pixel pairs 50 constitute one pixel position.

In addition, the pixel pair 50-1 and the pixel pair 50-2 are alternately arranged in the vertical direction and the horizontal direction in the present example. Accordingly, vertical and horizontal resolutions can be equalized. Moreover, the interpolation process of forming the first polarized image to the fourth polarized image may be achieved by a similar method. For example, in a case where the pixel pair 50-1 and the pixel pair 50-2 are arranged in a line-sequentially manner or the like, a different method of the interpolation process is used for the vertical direction and the horizontal direction. In addition, resolutions of images without interpolation are different for the vertical direction and for the horizontal direction. However, the present example solves these problems.

Note that the cancel image in this case is also formed by adding light reception signal values of two linear polarized lights having polarization directions orthogonal to each other for each pixel position (a pair of 0 deg and 90 deg, or a pair of 45 deg and 135 deg).

In this case, fitting of the cos curve after the first polarized image to the fourth polarized image are obtained, and the forming process of the virtual polarized image based on the cos curve are also similar to the fitting and the forming process described above, wherefore the same description is not repeated.

The imaging unit 11A in the modified example described above is capable of selectively receiving two types of linear polarized lights having polarization directions orthogonal to each other for the one pixel pair 50 (one pixel position), and is capable of selectively receiving four types of linear polarized lights having different polarization directions for the two pixel pairs disposed adjacent to each other.

Accordingly, resolution improvement of the virtual polarized image is achievable. In addition, incident light entering the one pixel pair 50 is received by a plurality of the light receiving elements 12a, wherefore improvement of light reception sensitivity can improve for each pixel position.

5. Summary of Embodiments

As described above, an imaging apparatus (1, 1A, or 1B) of the embodiments includes: an imaging unit (11 or 11A) which has a pixel group that includes a first pixel group including a pixel capable of receiving light having a first polarization direction, and a second pixel group; and an image forming unit (polarized light processing unit 21 or 21B) which forms a first image corresponding to a second polarization direction that is a predetermined polarization direction on the basis of signals of a pixel group including at least the first pixel group, and forms a second image different from the first image on the basis of signals of a pixel group including at least the second pixel group.

The image corresponding to the polarization direction refers to a polarized image including a component in a single polarization direction. According to the above configuration, the first image corresponding to the predetermined polarization direction that is the second polarization direction, and also the second image different from the first image are obtained on the basis of signals of the common imaging unit.

Accordingly, in the embodiments, the first image corresponding to the predetermined polarization direction, and the second image different from the first image can be obtained by one-time imaging using the imaging apparatus. Accordingly, captured images of a transparent part and an opaque part of an object or the like can be obtained by one-time imaging, for example.

In addition, in the imaging apparatus of the embodiments, the imaging unit images an object that has optical transparency. Light having passed through the object includes light having the second polarization direction.

In this manner, an image presenting the transparent part of the object can be obtained as the first image.

Accordingly, this configuration is suited for imaging of the object having the transparent part.

In addition, in the imaging apparatus of the embodiments, the first polarization direction and the second polarization direction are identical to each other.

In this manner, the first image can be formed using signals of the first pixel group without change, and without using a function.

Accordingly, a processing load for forming the first image can be reduced.

In addition, in the imaging apparatus of the embodiments, the first polarization direction and the second polarization direction are different from each other.

In this manner, an image corresponding to a polarization direction different from the first polarization direction (i.e., polarization direction of linear polarized light receivable by the first pixel group) can be obtained as the first image. In other words, for obtaining the first image, the necessity of equalizing the polarization direction corresponding to the first image and the polarization direction of linear polarized light receivable by the first pixel group is eliminated.

Accordingly, the degree of freedom of the disposition posture of the imaging unit in obtaining the first image can be improved.

In addition, in the imaging apparatus of the embodiments, the image forming unit simultaneously forms the first image and the second image.

In this manner, the first image and the second image are simultaneously formed on the basis of signals of the common imaging unit.

Accordingly, the first image and the second image can be formed by one-time imaging using the one imaging apparatus.

In addition, in the imaging apparatus of the embodiment, the imaging unit includes a plurality of pixel units (U or U') each of which includes a plurality of pixels each having a predetermined number of light receiving elements (12a), and a polarization unit (optical member 13, or polarization splitter 51-1 or 51-2) that causes the pixels to receive linear polarized lights having polarization directions different for each of the pixels.

In this manner, each of the pixel units receives linear polarized light having a different polarization direction for each pixel.

Accordingly, image data which becomes an image of any polarization condition can be formed by extracting a light reception signal of predetermined linear polarized light from each of the pixel units, or calculating the light reception signal of the linear polarized light. By forming images corresponding to different polarization conditions, a plurality of images having different polarization conditions for the object can be obtained by one-time imaging.

The "polarization conditions" herein refer to conditions associated with polarized light (linear polarized light). For example, a relation between an image corresponding to a predetermined polarization direction (an image obtained by selectively receiving linear polarized light corresponding to a predetermined single polarization direction) such as an orthogonal image and a parallel image, and a cancel image (an image corresponding to an image obtained by receiving non-polarized light) corresponds to a relation between images having different "polarization conditions." In addition, a relation between an image corresponding to a predetermined polarization direction and an image corresponding to a polarization direction different from the predetermined polarization direction, such as a relation between an orthogonal image and a parallel image, also corresponds to a relation between images having different "polarization conditions."

In addition, in the imaging apparatus of the embodiments, when a rotation angle of a polarizing filter that is rotatable is a virtual filter angle on an assumption that a captured image is obtained by receiving light via the polarizing filter, the image forming unit forms, as one of image data to be formed, image data that becomes an orthogonal image corresponding to an image obtained in a case where the virtual filter angle is an angle substantially orthogonal to a polarization direction of linear polarized light having entered the polarization unit.

In other words, an orthogonal image presenting a transparent part is obtained

The image of the orthogonal polarized light is an image of a transparent portion expressed by birefringence produced by the polarized light passing through the transparent part.

This orthogonal image is suited for imaging of an object having a transparent part.

In addition, in the imaging apparatus of the embodiments, the image forming unit acquires a function (F) that indicates a relation between the virtual filter angle and light reception signal values of the light receiving elements included in the pixel unit and receiving linear polarized lights different from each other, and forms image data that becomes the orthogonal image using the function.

In other words, an orthogonal image presenting a transparent part is obtained by using the function indicating the relation between the virtual filter angle and the light reception signal values.

In this manner, an image of the object where the transparent part is observable can be appropriately obtained.

In addition, in the imaging apparatus of the embodiments, the image forming unit forms, as one of image data to be formed, image data that becomes a cancel image that cancels a function of the polarizing filter.

In other words, the cancel image presenting an opaque part is obtained as well as the orthogonal image presenting the transparent part.

In this manner, the orthogonal image presenting the transparent part, and the cancel image presenting the opaque part can be obtained by one-time imaging using the common imaging unit.

Accordingly, for obtaining a captured image of the object including both the transparent part and the opaque part, the necessity of separately providing an imaging apparatus for imaging the transparent part and an imaging apparatus for imaging the opaque part to individually image the object is eliminated. Improvement of work efficiency is therefore achieved.

In addition, in the imaging apparatus of the embodiments, the image forming unit performs a process of forming a synthesis image of the orthogonal image and the cancel image.

In other words, a synthesis image which synthesizes the orthogonal image presenting the transparent part, and the cancel image presenting an opaque part is formed.

In this manner, an image where the transparent part and the opaque part of the object are simultaneously observable can be provided as the synthesis image.

In this case, alignment between images performed during synthesis of captured images of different imaging apparatuses is also eliminated, wherefore work efficiency of the synthesis image improves.

In addition, in the imaging apparatus of the embodiments, the image forming unit performs a process of forming a synthesis image of an image of a transparent part extracted on the basis of a difference between the orthogonal image and the cancel image, and an image of an opaque part extracted from the cancel image.

The transparent part of the object can be extracted on the basis of the difference between the orthogonal image and the opaque part. The cancel image is a normal image, wherefore extraction of the opaque part from the cancel image is achievable.

In this manner, a synthesis image where the transparent part and the opaque part of the object are simultaneously observable can be easily formed.

In this case, captured image signals of the imaging apparatus at a time are similarly used, wherefore the necessity of alignment of the transparent part and the opaque part between images is eliminated.

Furthermore, in the imaging apparatus of the embodiments, the image forming unit forms an image where a contour of a transparent object is observable.

More specifically, the image where the contour of the transparent object is observable is formed by calculation of an image corresponding to a predetermined polarization condition, synthesis of a plurality of images corresponding to a predetermined polarization condition, or others.

In this manner an imaging apparatus suited for observation of a transparent object can be provided.

In addition, in the imaging apparatus of the embodiments, the image forming unit forms an image where a contour of an opaque object is observable.

More specifically, the image where the contour of the opaque object is observable is formed by calculation of an image corresponding to a predetermined polarization condition, synthesis of a plurality of images corresponding to a predetermined polarization condition, or others.

In this manner an imaging apparatus suited for observation of an opaque object can be provided. Particularly, this configuration is effective for inclination detection of an opaque sheet or the like, such as ordinary paper for copying machines.

In addition, in the imaging apparatus of the embodiments, the image forming unit forms an image where a contour of an object is observable, and forms an image subjected to rotation correction using information indicating the contour determined from the image.

An inclination is detectable from a contour line of a transparent object or an opaque object. Rotation compensation of an image presenting an object is performed on the basis of an inclination detected in this manner.

In this manner, a corrected image can be provided even in a case where the object is inclined. For example, in a case where copy paper or a copy source sheet is inclined in a copying machine, a projector or the like, a copy image corrected to a normal direction can be formed.

Furthermore, in the imaging apparatus of the embodiments, the imaging unit includes a plurality of pixel pairs each of which includes polarization splitters, a first type of pixel that includes a predetermined number of light receiving elements each of which has a light receiving surface substantially orthogonal to an optical axis of reflection light reflected on a separation surface of the polarization splitter to receive the reflection light, and a second type of pixel that includes a predetermined number of light receiving elements each of which has a light receiving surface substantially orthogonal to an optical axis of transmission light transmitted through a separation surface of the polarization splitter to receive the transmission light. In-plane angles of polarization axes of the separation surfaces of the polarization splitters included in the pixel pair disposed adjacent to each other are different from each other.

The imaging unit described above is capable of selectively receiving two linear polarized lights having polarization directions orthogonal to each other for the one pixel pair (one pixel position), and is capable of selectively receiving linear polarized lights of four types having different polarization directions for the two pixel pairs disposed adjacent to each other.

Accordingly, resolution improvement of the virtual polarized image is achievable. In addition, incident light entering the one pixel pair is received by a plurality of the light receiving elements, and therefore is capable of improving light reception sensitivity can improve for each pixel position.

In addition, an imaging system (10, 10A, or 10B) of the embodiments includes: polarized lighting (light emission unit 2 and polarizing filter 3, or first light emission unit 41 and polarizing filter 42) that applies light that is linear polarized light; an imaging unit (11 or 11A) that has a pixel group that includes a first pixel group including a pixel capable of receiving light having a first polarization direction, and a second pixel group; and an image forming unit (polarized light processing unit 21 or 21B) that forms a first image corresponding to a second polarization direction that is a predetermined polarization direction on the basis of signals of a pixel group including at least the first pixel group, and forms a second image different from the first image on the basis of signals of a pixel group including at least the second pixel group.

For example, the polarized lighting refers to lighting which applies polarized light at a predetermined angle to an object using a configuration which includes a lighting device and a polarizing filter or the like.

The polarized lighting applies light to the object from the rear of the object, and the imaging unit receives light on the front surface side of the object. The image forming unit forms an image (orthogonal image) corresponding to a polarization direction orthogonal to a polarization direction of the polarized light as the first image. In this manner, an image where a transparent object is observable can be obtained In this case, captured images of the transparent part and the opaque part of the object can be obtained by one-time imaging by forming a cancel image corresponding to an image obtained by receiving non-polarized light as the second image, for example, using the image forming unit.

In addition, the imaging system (10A or 10B) of the embodiments further includes lighting (6 or 43) that applies non-polarized light to an object in a direction different from a direction of the polarized lighting.

For example, lighting which guides image light on the surface of the object toward the imaging unit is added.

In this manner, an image where the object is observable in more detail can be obtained.

In addition, in the imaging system of the embodiments, the imaging unit is disposed in such a position as to image a front surface side of an object in a state where the polarized lighting applies light to the object from a rear surface side of the object.

In this case, an image which separates a portion producing birefringence of the polarized lighting in the object can be formed.

More specifically, polarized light produces birefringence in a transparent part of the object. For example, when an orthogonal image is formed, this birefringence is expressed in the image. In other words, an image indicating a transparent portion can be obtained.

Furthermore, in the imaging system of the embodiments, the imaging unit is disposed in such a position as to image a front surface side of an object in a state where the polarized lighting applies light to the object from a rear surface side of the object. Lighting that applies non-polarized light from a front side of the object is provided.

In this case, performed is such imaging which forms an image separating a portion producing birefringence of polarized lighting in the object, and an image capable of expressing a surface of the object.

In other words, an image expressing a surface of the object on the front side can be obtained by applying normal lighting to the front side of the object.

Note that advantageous effects to be produced are not limited to the advantageous effects described in the present description presented only by way of example. In addition, other advantageous effects may be produced.

6. Present Technology

Note that the present technology may adopt following configurations.

(1)

An imaging apparatus including:

an imaging unit which has a pixel group that includes a first pixel group including a pixel capable of receiving light having a first polarization direction, and a second pixel group; and an image forming unit which forms a first image corresponding to a second polarization direction that is a predetermined polarization direction on the basis of signals of a pixel group including at least the first pixel group, and forms a second image different from the first image on the basis of signals of a pixel group including at least the second pixel group.

(2)

The imaging apparatus according to (1) described above, in which the imaging unit images an object that has optical transparency, light having passed through the object including light having the second polarization direction.

(3)

The imaging apparatus according to (1) or (2) described above, in which the first polarization direction and the second polarization direction are identical to each other.

(4)

The imaging apparatus according to (1) or (2) described above, in which the first polarization direction and the second polarization direction are different from each other.

(5)

The imaging apparatus according to any one of (1) to (4) described above, in which the image forming unit simultaneously forms the first image and the second image.

(6)

The imaging apparatus according to any one of (1) to (5) described above, in which the imaging unit includes a plurality of pixel units each of which includes a plurality of pixels each having a predetermined number of light receiving elements, and a polarization unit that causes the pixels to receive linear polarized lights having polarization directions different for each of the pixels.

(7)

The imaging apparatus according to (6) described above, in which when a rotation angle of a polarizing filter that is rotatable is a virtual filter angle on an assumption that a captured image is obtained by receiving light via the polarizing filter, the image forming unit forms, as one of image data to be formed, image data that becomes an orthogonal image corresponding to an image obtained in a case where the virtual filter angle is an angle substantially orthogonal to a polarization direction of linear polarized light having entered the polarization unit.

(8)

The imaging apparatus according to (7) described above, in which the image forming unit acquires a function that indicates a relation between the virtual filter angle and light reception signal values of the light receiving elements included in the pixel unit and receiving linear polarized lights different from each other, and forms image data that becomes the orthogonal image using the function.

(9)

The imaging apparatus according to (8) described above, in which the image forming unit forms, as one of image data to be formed, image data that becomes a cancel image that cancels a function of the polarizing filter.

(10)

The imaging apparatus according to (9) described above, in which the image forming unit performs a process of forming a synthesis image of the orthogonal image and the cancel image.

(11)

The imaging apparatus according to (9) described above, in which the image forming unit performs a process of forming a synthesis image of an image of a transparent part extracted on the basis of a difference between the orthogonal image and the cancel image, and an image of an opaque part extracted from the cancel image.

(12)

The imaging apparatus according to any one of (1) to (11) described above, in which the image forming unit forms an image where a contour of a transparent object is observable.

(13)

The imaging apparatus according to any one of (1) to (11) described above, in which the image forming unit forms an image where a contour of an opaque object is observable.

(14)

The imaging apparatus according to any one of (1) to (11) described above, in which the image forming unit forms an image where a contour of an object is observable, and forms an image subjected to rotation correction using information indicating the contour determined from the image.

(15)

The imaging apparatus according to any one of (1) to (14) described above, in which the imaging unit includes a plurality of pixel pairs each of which includes a polarization splitter, a first type of pixel which includes a predetermined number of light receiving elements each of which has a light receiving surface substantially orthogonal to an optical axis of reflection light reflected on a separation surface of the polarization splitter to receive the reflection light, and a second type of pixel which includes a predetermined number of light receiving elements each of which has a light receiving surface substantially orthogonal to an optical axis of transmission light transmitted through a separation surface of the polarization splitter to receive the transmission light, and in-plane angles of polarization axes of the separation surfaces of the polarization splitters included in the pixel pair disposed adjacent to each other are different from each other.

(16)

An imaging system including:

polarized lighting which applies light that is linear polarized light;

an imaging unit which has a pixel group that includes a first pixel group including a pixel capable of receiving light having a first polarization direction, and a second pixel group; and an image forming unit which forms a first image corresponding to a second polarization direction that is a predetermined polarization direction on the basis of a pixel group including at least the first pixel group, and forms a second image different from the first image on the basis of signals of a pixel group including at least the second pixel group.

(17)

The imaging system according to (16) described above, further including:

lighting that applies non-polarized light to an object in a direction different from a direction of the polarized lighting.

(18)

The imaging system according to (16) or (17) described above, in which the imaging unit is disposed in such a position as to image a front surface side of an object in a state where the polarized lighting applies light to the object from a rear surface side of the object.

(19)

The imaging system according to (16) described above, in which the imaging unit is disposed in such a position as to image a front surface side of an object in a state where the polarized lighting applies light to the object from a rear surface side of the object, and lighting that applies non-polarized light from a front side of the object is provided.

REFERENCE SIGNS LIST 1, 1A, 1B Imaging apparatus, 2 Light emission unit, 3 Polarizing filter, 5a Transparent part, 5'a Sheet display information, 5b Opaque part, 6 Light emission unit, 10, 10A, 10B Imaging system, 11, 11A Imaging unit, 12 Imaging device, 12a Light receiving element, 13 Optical member, 13a Polarizing filter, 21, 21B Polarized light processing unit, 30, 30B Control unit, 41 First light emission unit, 42 Polarizing filter, 43 Second light emission unit

The invention claimed is:

1. An imaging apparatus comprising:

an imager that has a pixel group that includes a first pixel group including a pixel capable of receiving light having a first polarization direction, and a second pixel group; and a processor configured to form a first image corresponding to a second polarization direction that is a predetermined polarization direction on a basis of signals of a pixel group including at least the first pixel group, and to form a second image different from the first image on a basis of signals of a pixel group including at least the second pixel group, wherein the first polarization direction and the second polarization direction are different from each other.

2. An imaging apparatus comprising:

an imager that has a pixel group that includes a first pixel group including a pixel capable of receiving light having a first polarization direction, and a second pixel group; and a processor configured to form a first image corresponding to a second polarization direction that is a predetermined polarization direction on a basis of signals of a pixel group including at least the first pixel group, and to form a second image different from the first image on a basis of signals of a pixel group including at least the second pixel group, wherein the imager images an object that has optical transparency, light having passed through the object including light having the second polarization direction.

3. The imaging apparatus according to claim 2, wherein the first polarization direction and the second polarization direction are identical to each other.

4. The imaging apparatus according to claim 1, wherein the processor is configured to simultaneously form the first image and the second image.

5. The imaging apparatus according to claim 2, wherein the imager includes a plurality of pixel units each of which includes a plurality of pixels each having a predetermined number of light receiving elements, and a polarizer that causes the pixels to receive linear polarized lights having polarization directions different for each of the pixels.

6. The imaging apparatus according to claim 5, wherein when a rotation angle of a polarizing filter that is rotatable is a virtual filter angle on an assumption that a captured image is obtained by receiving light via the polarizing filter, the processor forms, as one of image data to be formed, image data that becomes an orthogonal image corresponding to an image obtained in a case where the virtual filter angle is an angle substantially orthogonal to a polarization direction of linear polarized light having entered the polarizer.

7. The imaging apparatus according to claim 6, wherein the processor is configured to acquire a function that indicates a relation between the virtual filter angle and light reception signal values of the light receiving elements included in the pixel unit and receiving linear polarized lights different from each other, and form image data that becomes the orthogonal image using the function.

8. The imaging apparatus according to claim 7, wherein the processor is configured to form, as one of image data to be formed, image data that becomes a cancel image that cancels a function of the polarizing filter.

9. The imaging apparatus according to claim 8, wherein the processor is configured to perform a process of forming a synthesis image of the orthogonal image and the cancel image.

10. The imaging apparatus according to claim 8, wherein the processor is configured to perform a process of forming a synthesis image of an image of a transparent part extracted on a basis of a difference between the orthogonal image and the cancel image, and an image of an opaque part extracted from the cancel image.

11. An imaging apparatus comprising:
an imager that has a pixel group that includes a first pixel group including a pixel capable of receiving light having a first polarization direction, and a second pixel group; and
a processor configured to form a first image corresponding to a second polarization direction that is a predetermined polarization direction on a basis of signals of a pixel group including at least the first pixel group, and to form a second image different from the first image on a basis of signals of a pixel group including at least the second pixel group, wherein the processor forms an image where a contour of a transparent object is observable.

12. The imaging apparatus according to claim 1, wherein the processor is configured to form an image where a contour of an opaque object is observable.

13. The imaging apparatus according to claim 1, wherein the processor is configured to form an image where a contour of an object is observable, and form an image subjected to rotation correction using information indicating the contour determined from the image.

14. The imaging apparatus according to claim 1, wherein the imager includes a plurality of pixel pairs each of which includes a polarization splitter, a first type of pixel which includes a predetermined number of light receiving elements each of which has a light receiving surface substantially orthogonal to an optical axis of reflection light reflected on a separation surface of the polarization splitter to receive the reflection light, and a second type of pixel which includes a predetermined number of light receiving elements each of which has a light receiving surface substantially orthogonal to an optical axis of transmission light transmitted through a separation surface of the polarization splitter to receive the transmission light, and
in-plane angles of polarization axes of the separation surfaces of the polarization splitters included in the pixel pair disposed adjacent to each other are different from each other.

15. An image forming method comprising:
imaging an object using an imager which has a pixel group that includes a first pixel group including a pixel capable of receiving light having a first polarization direction, and a second pixel group; and
forming a first image corresponding to a second polarization direction that is a predetermined polarization direction on a basis of signals of a pixel group including at least the first pixel group, and forming a second image different from the first image on a basis of signals of a pixel group including at least the second pixel group, wherein the first polarization direction and the second polarization direction are different from each other.

16. An imaging system comprising:
a polarized light source configured to apply light that is linear polarized light;
an imager that has a pixel group that includes a first pixel group including a pixel capable of receiving light having a first polarization direction, and a second pixel group; and
a processor configured to form a first image corresponding to a second polarization direction that is a predetermined polarization direction on a basis of signals of a pixel group including at least the first pixel group, and to form a second image different from the first image on a basis of signals of a pixel group including at least the second pixel group, wherein
the imager is disposed in such a position as to image a front surface side of an object in a state where the polarized lighting applies light to the object from a rear surface side of the object.

17. The imaging system according to claim 16, wherein lighting that applies non-polarized light to the object in a direction different from a direction of the polarized lighting is provided.

18. The imaging system according to claim 16, wherein lighting that applies non-polarized light from a front side of the object is provided.

* * * * *